(12) United States Patent
Foreman et al.

(10) Patent No.: US 9,750,231 B2
(45) Date of Patent: Sep. 5, 2017

(54) PORTABLE BASKET COLONY FOR GROWING AND TRANSPORT AND METHOD OF USE

(71) Applicant: Tyson Foods, Inc.

(72) Inventors: Doug Foreman, Springdale, AR (US); Stephen Brannan, Wesley, AR (US); James Ruff, Farmington, AR (US); David Lee Mantooth, Fayetteville, AR (US); Theodore Burnett, Fayetteville, AR (US)

(73) Assignee: Tyson Foods, Inc., Springdale, AR (US)

( * ) Notice: Subject to any disclaimer, the term of this patent is extended or adjusted under 35 U.S.C. 154(b) by 191 days.

(21) Appl. No.: 14/754,923

(22) Filed: Jun. 30, 2015

(65) Prior Publication Data
US 2015/0373952 A1 Dec. 31, 2015

Related U.S. Application Data

(62) Division of application No. 13/777,767, filed on Feb. 26, 2013, now Pat. No. 9,119,382.

(51) Int. Cl.
  *A01K 31/07* (2006.01)
  *A01K 45/00* (2006.01)
  (Continued)

(52) U.S. Cl.
  CPC .......... *A01K 45/005* (2013.01); *A01K 31/005* (2013.01); *A01K 31/07* (2013.01); *A01K 31/18* (2013.01)

(58) Field of Classification Search
  CPC .... A01K 45/005; A01K 31/00; A01K 31/002; A01K 31/007; A01K 31/06; A01K 31/07;
  (Continued)

(56) References Cited

U.S. PATENT DOCUMENTS

| | | | | |
|---|---|---|---|---|
| 932,086 A | * | 8/1909 | Allen | B65D 15/22 119/490 |
| 2,065,416 A | * | 12/1936 | Albert | A01K 31/002 220/4.28 |

(Continued)

FOREIGN PATENT DOCUMENTS

| | | | |
|---|---|---|---|
| EP | 0220782 | 5/1987 | |
| NL | EP 0220782 A1 * | 5/1987 | ............. A01K 39/02 |

OTHER PUBLICATIONS

United States Department of Agriculture (USDA), Animal and Plant Health Inspection Service. 'Backyard Biosecurity: 6 Ways to Prevent Poultry Diseases' [online], Jun. 2008 [retrieved on Mar. 7, 2014]. Retrieved from the Internet: <URL: http://www.aphis.usda.gov/publications/animal_health/contenUprintable_version/6-Step-Poster-English_Arabic.pdf>.

*Primary Examiner* — Kathleen Alker
(74) *Attorney, Agent, or Firm* — Mark E. Stallion

(57) ABSTRACT

A colony basket and method of using the same for handling poultry from DOC through the growing process and on to a production facility comprising a harvesting system, a loading system, a transport system, an unloading and storing system, hanging system and cleaning system. The system and method performs the steps of harvesting and colonizing live poultry into a singly stackable and transportable colony basket, stacking and loading the trays on a transport, unloading and temporarily storing the poultry for subsequent processing.

12 Claims, 26 Drawing Sheets

(51) Int. Cl.
*A01K 31/00* (2006.01)
*A01K 31/18* (2006.01)

(58) Field of Classification Search
CPC ........ A01K 31/18; A01K 31/14; A01K 31/17; A01K 39/00; A01K 39/01; A01K 39/014; A01K 39/02; A01K 39/04; A01K 31/005
See application file for complete search history.

(56) References Cited

U.S. PATENT DOCUMENTS

| | | | | |
|---|---|---|---|---|
| 2,562,691 A | * | 7/1951 | Beringer | A01K 31/005 119/309 |
| 2,715,492 A | * | 8/1955 | Zebarth | B65D 11/10 206/511 |
| 3,368,579 A | * | 2/1968 | Godshalk | A01K 39/02 119/81 |
| 3,416,464 A | | 12/1968 | Gutridge | |
| 3,507,441 A | * | 4/1970 | Giroud | A01K 31/002 119/454 |
| 3,520,281 A | * | 7/1970 | Hart | A01K 31/17 119/75 |
| 3,528,583 A | | 9/1970 | Taylor | |
| 3,727,582 A | * | 4/1973 | Heying | A01K 31/17 119/478 |
| 3,930,467 A | | 1/1976 | Fier | |
| 4,036,177 A | * | 7/1977 | DeSmit | A01K 31/005 119/457 |
| 4,365,591 A | | 12/1982 | Wills et al. | |
| 4,527,513 A | * | 7/1985 | Hart | A01K 39/04 119/51.5 |
| 4,662,532 A | | 5/1987 | Anderson et al. | |
| 4,928,633 A | * | 5/1990 | Jennings | A01K 39/02 119/72.5 |
| 4,998,967 A | | 3/1991 | Box | |
| 5,761,854 A | | 6/1998 | Johnson et al. | |
| 5,902,089 A | | 5/1999 | Sinn et al. | |
| 6,062,469 A | | 5/2000 | Hafer et al. | |
| 6,338,316 B1 | | 1/2002 | Weaver | |
| 6,447,234 B2 | | 9/2002 | Sinn et al. | |
| 6,694,918 B2 | | 2/2004 | Draft | |
| 6,766,768 B1 | | 7/2004 | Ver Hage | |
| 6,851,389 B2 | | 2/2005 | Giordano et al. | |
| 6,880,488 B1 | | 4/2005 | Hall | |
| 7,661,392 B2 | | 2/2010 | Conger et al. | |
| 8,622,266 B2 | | 1/2014 | McMillan | |
| 2003/0056731 A1 | * | 3/2003 | Darby | A01K 39/0213 119/72 |
| 2005/0103278 A1 | * | 5/2005 | Espinda | A01K 39/00 119/467 |
| 2009/0007853 A1 | * | 1/2009 | Johnson | A01K 45/005 119/453 |
| 2012/0325162 A1 | * | 12/2012 | Wideman, Jr. | A01K 31/007 119/713 |
| 2014/0299067 A1 | | 10/2014 | Foreman et al. | |

* cited by examiner

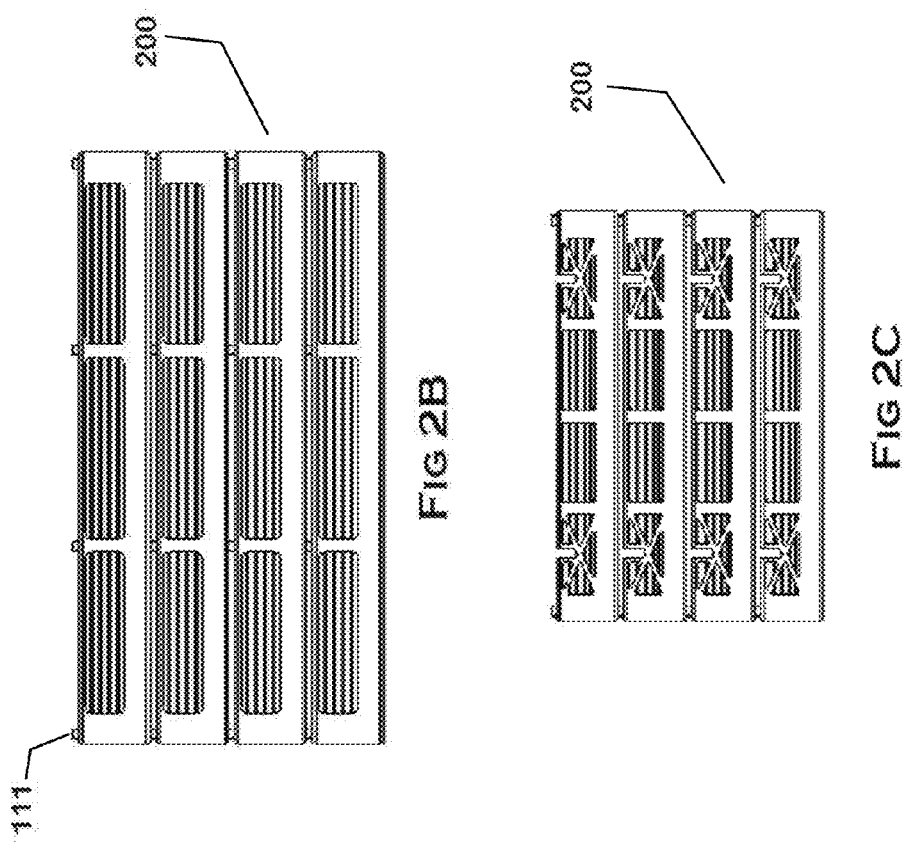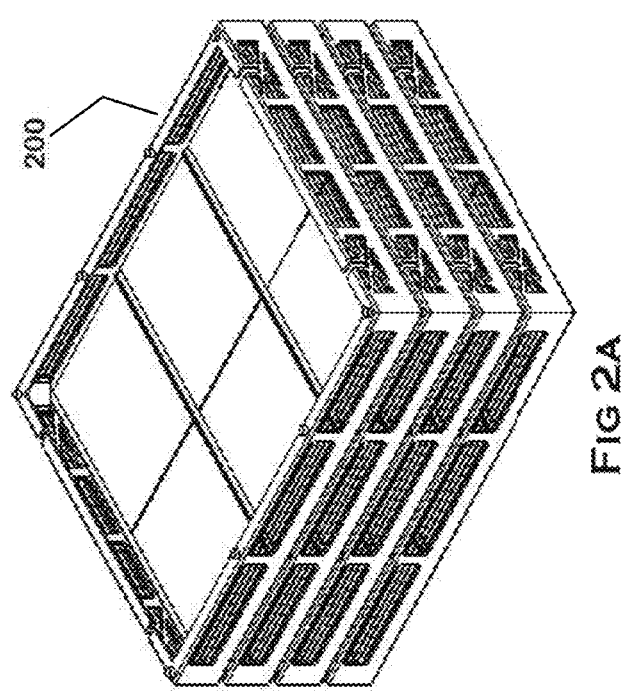

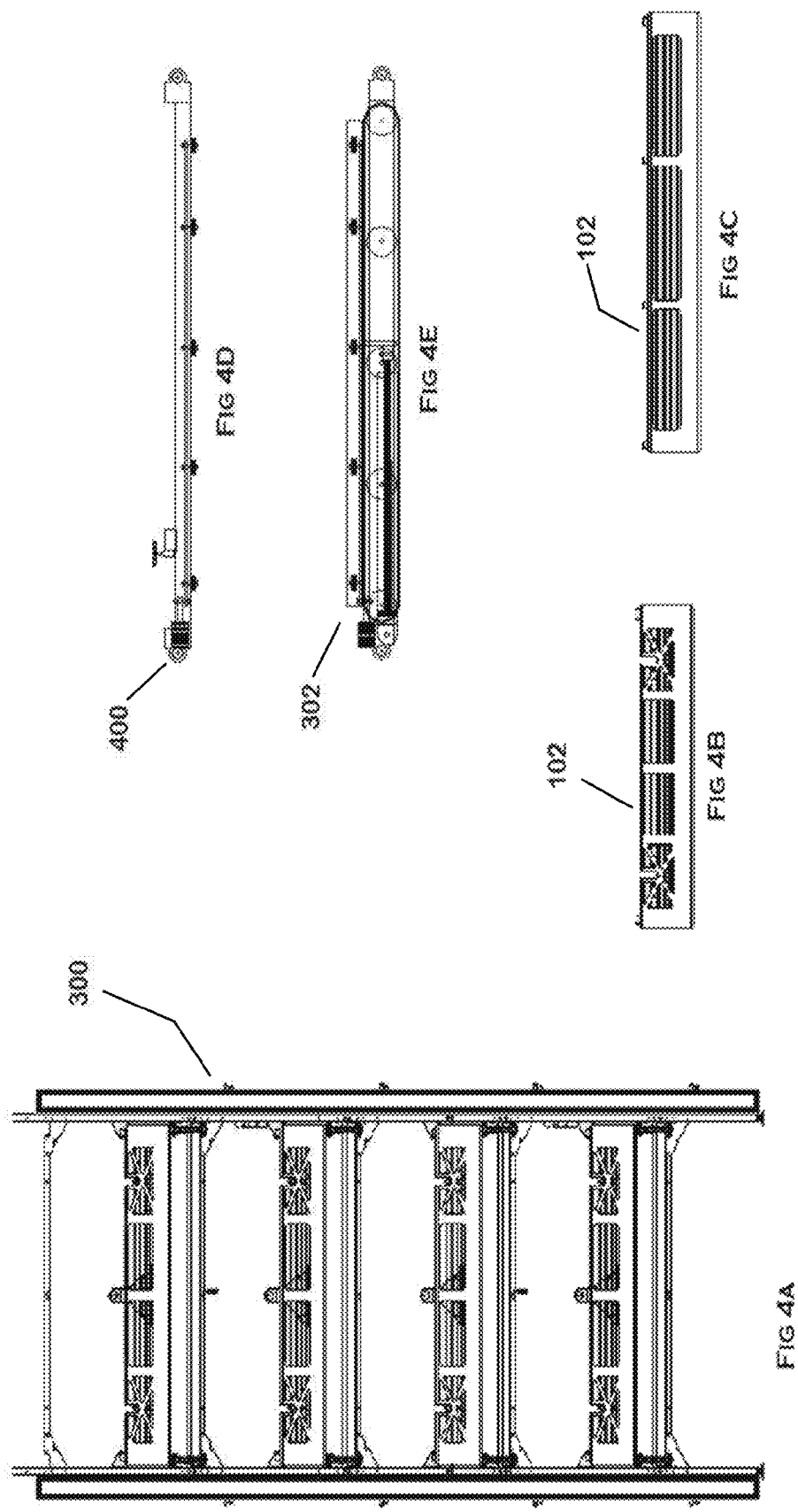

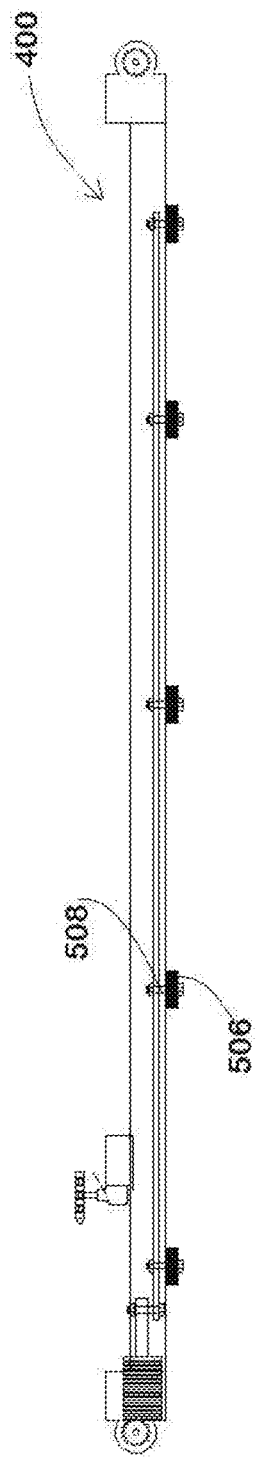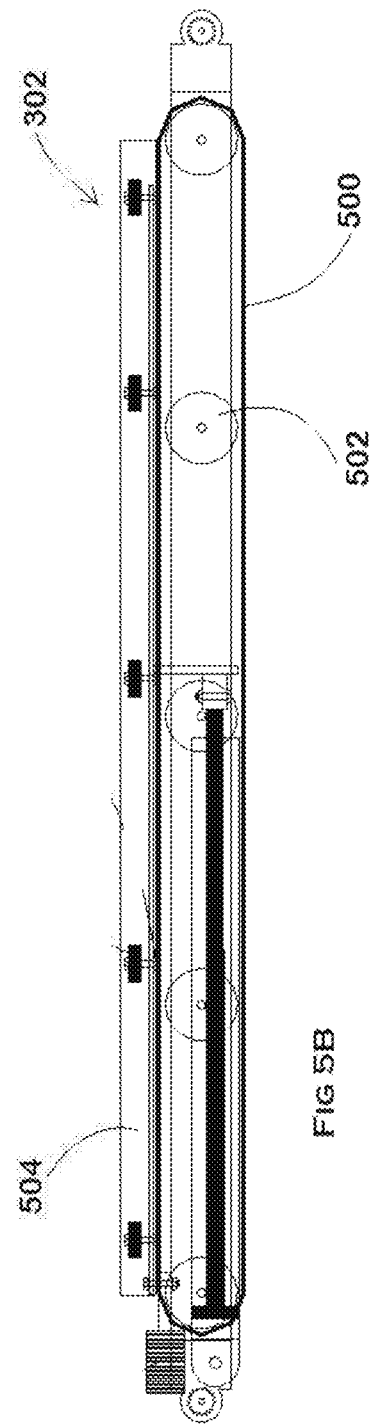

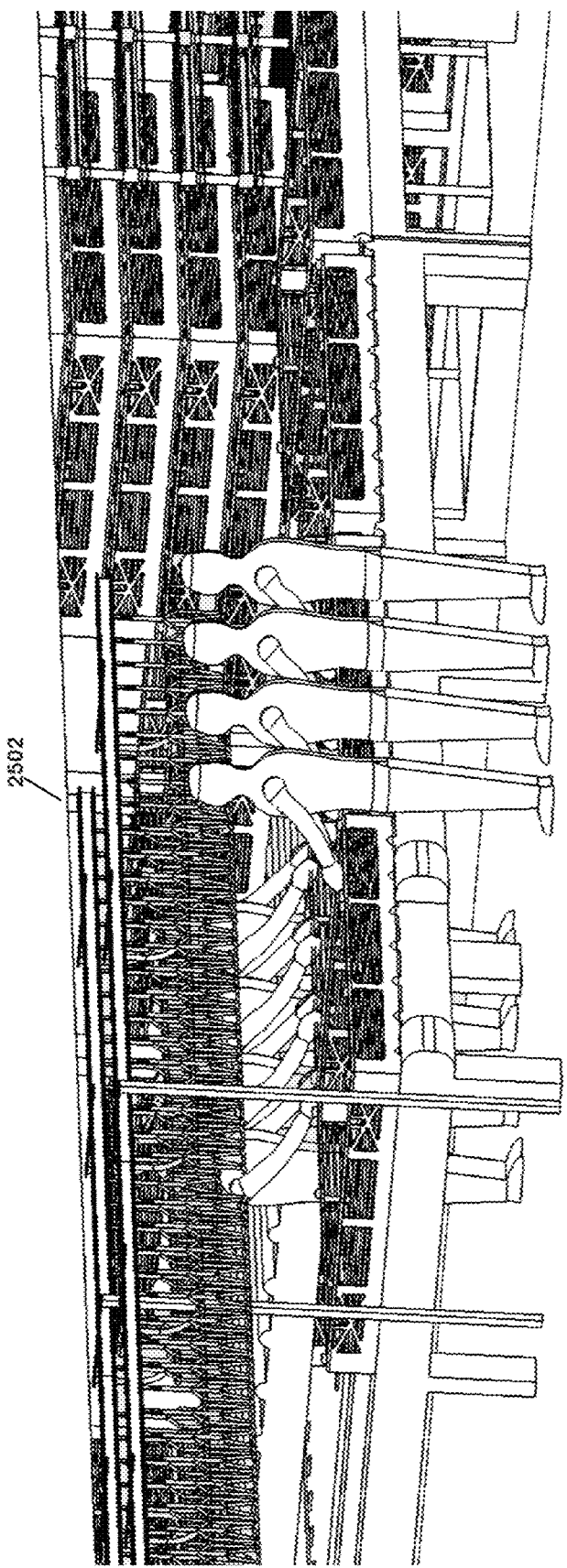

PORTABLE BASKET COLONY FOR GROWING AND TRANSPORT AND METHOD OF USE

CROSS REFERENCE

This application is a divisional of and claims the benefit of and priority to co-pending U.S. application Ser. No. 13/777,767, filed Feb. 26, 2013, which is incorporated herein by reference in its entirety.

BACKGROUND

Field

The field relates generally to poultry processing and more particularly to handling, growing and transporting live poultry.

Background Art

Loading and unloading birds and transportation of live birds from the hatchery stage through the kill stage at a production facility is a challenging task. The birds have to be gathered, contained and transferred to a transport means and subsequently unloaded with minimal damage or harm to the animal, which is challenging because birds instinctively resist such movement. For example, transport of live poultry from the hatchery to colony systems in growing houses and from growing houses to processing facilities is required. One method of transport of live poultry is containing the birds in cages and stacking the cages on a truck with a flatbed trailer for transport. Loading and unloading trailers with live animals, particularly from a location where the animals are grown or raised to a processing facility, can in the case of chickens, increase the stress level of the animal. With heightened stress, animals are more likely to have increased body temperature, experience bruising, dislocated wing/leg joints and potential tissue damage along with an increased pH level, which may affect the quality of the muscle. Once the birds are captured in cages, the cages are loaded on the trailer.

Existing systems involve crews of catchers to unload the birds from the growing colonies and load them for transport means. Loading of the cages on the trailer consumes the full time of one operator to move cages from the house or growing area to the trailer and it requires skill to stack cages on the trailer so that they can be properly secured for transport. The cages often become damaged in this operation over time and need to be repaired and eventually replaced. Damage to the cages often involves damaged doors through which the birds are inserted. Poorly operating doors can lead to increased time to load cages and can potentially result in harm to the birds.

There are significant labor issues because the process of transporting and transferring birds is very labor intensive and requires some level of skill and training. There are health issues for both the birds and the handlers. The labor intensive handling of the birds promotes the transmission of infections to the handler and risks harm to the birds. This results in numerous health and safety concerns. The cages or other transport containers also have to be cleaned prior reuse, which can also be a labor intensive and costly effort.

In the catching process, the poultry are placed into cages. Some cage designs consist of "drawers" and can vary from 10 to 15 drawers averaging a 20-25 bird capacity per drawer. Birds can be placed into the cages either manually or by semi-automatic means. A forklift then can load a flatbed truck with 18-22 cages that are stacked in pairs. Once the cages are in place, each stack has to be secured by chains to the frame of the trailer.

Semi-automated methods of harvesting the birds in the houses have encountered mechanical and functional problems. In one sense this semi-automated method eliminates the need for operators to physically pick up the birds. However, operators are still needed to operate the equipment and to move the birds forward and away from the sides of the house. Therefore, some handling is still necessary.

Plastic poultry trays or drawers are sometimes used to transport and house birds temporarily, however, these systems are temporal and only used during certain stages and are not integral with growing systems or transport systems. Use of such trays or drawers still require significant handling of birds, though they may be somewhat more durable than metal cages.

As noted above, problems occur with, loading, unloading, harvesting, placing birds into cages (plastic drawers or trays), loading the cages on a transport, and transporting to the processing facilities. Also, current processes are labor intensive and costly. The problems occur as the DOC (Day Old Chicks) are transitioned from the hatcheries to the growing centers and then to the production facilities. A new system and method for harvesting, loading, growing, transporting, and unloading is needed that addresses the above problems by reducing physical handling of the birds from the hatchery stage through the kill and production stage.

SUMMARY

The technology involves a system and method for handling poultry comprising a colony basket apparatus utilized throughout the process of transitioning the DOC from the hatchery, to the growing facility, through the growing process, and on to the production facility. The colony basket apparatus is utilized for harvesting, loading and unloading, growing, transport, storing and holding through the shackling process prior to the kill process. The method utilizes the colony basket apparatus to perform the steps of retrieving and loading a grouping of the DOC into the colony basket at the hatchery, transporting the same grouping of birds in the same colony basket to the growing facility, loading the colony basket containing the original grouping of birds into the colony system of the growing facility, growing the DOC to Broilers (chickens bread and raised specifically for meat production) in the original colony basket in which they were installed, removing and harvesting live poultry from the colony system while maintaining the same grouping of birds in the same colony basket in which they were originally placed, stacking and loading the colony basket of Broilers on a transport, transporting to a poultry processing production facility, unloading the colony basket and temporarily storing the poultry in the same colony basket for subsequent killing. The invention more particularly relates to a new portable colony basket for holding and making possible all necessary functions for the poultry animals from the DOC stage, through growing, through transport and up to production while maintaining a grouping of birds or subset thereof in the same colony basket throughout the process all of the way through the shackling process.

The concept of harvesting poultry utilizing one type of colony basket uniformly throughout the entire process from capturing the DOC at the hatchery to growing houses equipped with colony systems and on to production will make the process more efficient and will result in less worker and animal stress by resolving many of the problems related to the current methods of manually catching birds and placing in cages or other containers or using semi-automated systems to harvest and transition poultry. With the present invention, stackable tray colony baskets can be utilized that can be placed into and retrieved from colony systems in growing houses using automated systems and can be transferred and retrieved from transports when transitioning between locations within the overall process and the colony baskets can be further integrated with feeding and watering systems. The trays can be made from molded plastic or other material including metal aluminum metal and can have an open grid flexible flooring elevated above a lower manure trap flooring to keep the birds out of their manure and the sides can be vented. The bottoms can have an open grid pattern bottom to allow the birds to grasp with their paws to stabilize and reduce wing flapping, but the floor can also be flexible to reduce injury to the bird. The grid pattern also allows debris and litter to fall out to reduce cleaning and increased airflow to ventilate the birds. The top and bottom perimeter edges of the cages can be complimentary in shape for ease of stacking and stability reducing lateral movement of the stacked trays with respect to each other. The sides of the trays can also have vented openings. Once an upper tray is stacked on top of a lower tray, birds placed in the lower tray are contained. The upper most tray in a stack of trays can be capped by an additional empty tray or other cover or ceiling in the colony system or in the transport or other automated transitioning means.

An empty stack of colony baskets can be transported to a hatchery and loaded with DOC. The stack of colony baskets containing DOC can be loaded on a transport rack, which receives the colony baskets and transported to a growing house from the hatchery. The colony baskets can be unloaded from the transport rack to be transferred into a poultry house colony system manually or the transfer can by automated by a powered mover or conveyor and/or loading system. This method provides that no container stacks have to be manually or mechanically un-stacked for loading poultry because the DOC are already in the colony baskets. Previous systems required that trays be removed from a stack and then the poultry would be loaded into the trays and the trays are re-stacked, a powered mover can transport the trays to the outside to be loaded onto the trailer. The process of loading and unloading birds in the growing house has been eliminated.

The construction of the trailer can be a flatbed trailer with vertical framework to make up the structural integrity as well as to hold the stacks of individual colony baskets. There can be a plurality of vertical and horizontal rails to insure the structure and flexibility of the size and number of colony baskets the transport is capable of handling.

With the design of the present invention, there can be a frame work constructed on the transport trailer holding a lightweight material that can be pulled alongside the trailer to cover the sides. This shroud can create an envelope in which the environment can be better controlled and provide a more suitable environment for the animals.

Once the trailer arrives at the plant, the colony baskets can be unloaded and automatically moved into a warehouse or holding facility. This process can be performed as trucks arrive in order to build an entire storage of birds for a production shift. The trucks can be automatically unloaded in a very short period of time, thus eliminating the need for a forklift. The system can work in a "last-in first-out" method. The process can be improved through the efficiency of bringing the birds in the same colony basket that originated at the hatchery and the same colony basket continuing through the growing process and on to the production plant kill area and not consuming time loading and unloading birds into and out of cages or other containers.

The automated unloading can be done automatically to pull the trays off the trailer (or flatbed of transport) from the side of the truck in the stacked formation into a transport rack or onto either a conveyor or pull chain system. The transport rack or the conveyor can take the trays to the staging area where they can be un-stacked manually or by using destacker equipment.

With the proposed method, the colony baskets provide a perfect transport, growing container and housing means all in one unit to move the birds through the entire process. This system can eliminate the unnecessary handling of the birds and possibly make the process more efficient.

There are a number of advantages to the design of the present invention for harvesting poultry. Safety is increased for the handler and the birds and health risks are reduced. The efficiencies of handling and transporting birds is improved and the process is less labor intensive and causes less stress on animals.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIGS. 2A-2C are colony basket stacks;

FIG. 4A is a colony basket rack;

FIG. 4B is a latitudinal side plan view of a colony basket;

FIG. 4C is a longitudinal side plan view of a colony basket;

FIG. 4D is a colony basket rack support;

FIG. 4E is a colony basket rack conveyor assembly;

FIG. 5A is a colony basket rack support;

FIG. 5B is a colony basket rack conveyor assembly;

FIG. 25-26 is an illustration of colony baskets traveling through the kill line and the cleaning station.

Figure 1:
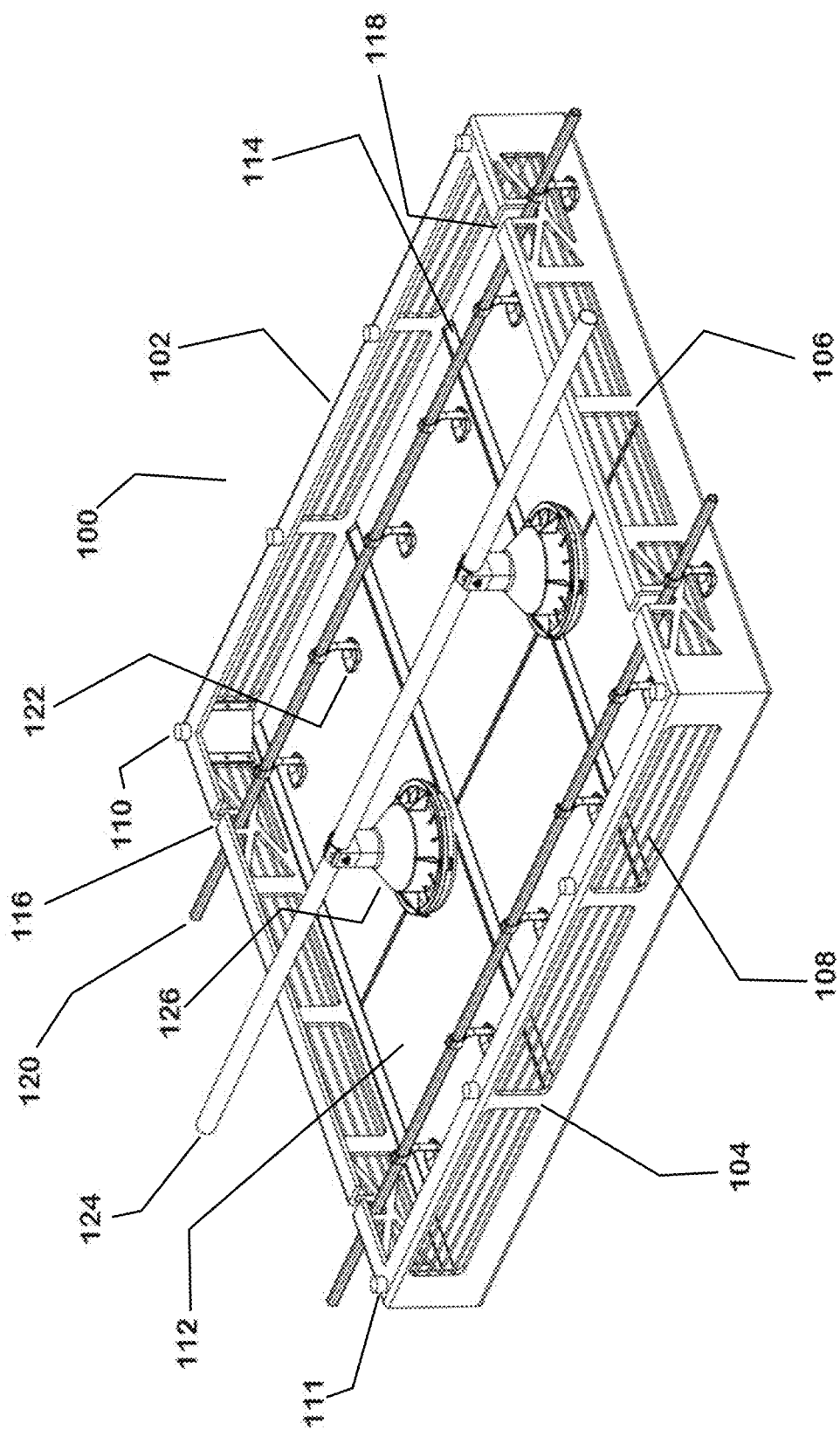
FIG. 1 is a colony basket integrated with a watering and feeding system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION

According to the embodiment(s) of the present invention, various views are illustrated in FIGS. 1-26 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the technology is a single colony basket design adapted to be used throughout poultry processing from the hatchery, through growing and to production. The colony basket includes components designed for the growing process and components designed for transport. The colony basket is adapted for an automated loading system including a stackable tray design, a transport system, and unloading and storing system.

The details of the invention and various embodiments can be better understood by referring to the figures of the drawing.

Referring to FIG. 1, a colony basket integrated with a watering and feeding system is shown. The colony basket growing assembly 100 is shown with a colony basket 102 having vented vertically upright side walls 104 and 106 extending between a top rim flange and a bottom rim flange. The vertically upright side walls include vented areas 108. The top rim flange includes a plurality of stand-offs as represented by items 110 and 111. The stand-offs can provide spacing between colony baskets when they are stacked one on top of the other and can resist lateral movement of the stacked baskets one with respect to the other. The bottom rim flange can include complimentary recessed receptacles to receive the stand-offs therein in order to interlock the stacked colony baskets and in order to prevent or resist lateral and longitudinal movement. The top rim flange and the adjacent side wall can have vertical slots 116 and 118 for receiving the water channel having a downward pointing exit nozzle and water trough assembly 120 and 122. The colony basket 102 can also be integrated with a feed channel 124 and feed trough 126. The feed assembly and the watering assembly can be more generally referred to as sustenance assemblies that can be elevated above the basket for basket removal and installation and ultimately lowered into the basket. The parametrical top rim flange defines an upward facing opening through which birds can be inserted into the basket. The downward facing opening is closed by a floor 112 providing support and a trap for debris. The floor 112 can have placed thereon elongated elevator strips 114 over which a flexible mesh flooring (Not Shown) can be supported and installed. The flexible mesh flooring, not shown, can have small openings through which debris can fall downward through the mesh flooring and be trapped by the floor 112. The flexibility of the mesh flooring prevents injury to birds standing thereon. The colony basket growing assembly 100 is shown in its configuration when it is integrated within a colony system whereby the birds are housed within the colony basket and provided nourishment for the growing process. For another embodiment, the floor 112 can be a mesh floor and the strips 114 can support the mesh floor. A further modification to this embodiment can include an under panel or cover that removably attaches immediately underneath the mesh floor 112.

Referring to FIG. 2, a colony basket stack is shown. In FIGS. 2A-2C various views of a colony basket stack 200 is shown. The colony baskets are shown stacked one on top of the other. The colony basket stack 200 can be transported in this configuration and as seen in the various views, the colony baskets are vertically spaced one with respect to the other by the stand-offs 111 and 110. The bottom facing rim 202 of the basket above can be configured with a mating receptacle recess 204 for receiving the stand-off of the basket immediately below.

Figure 3B:
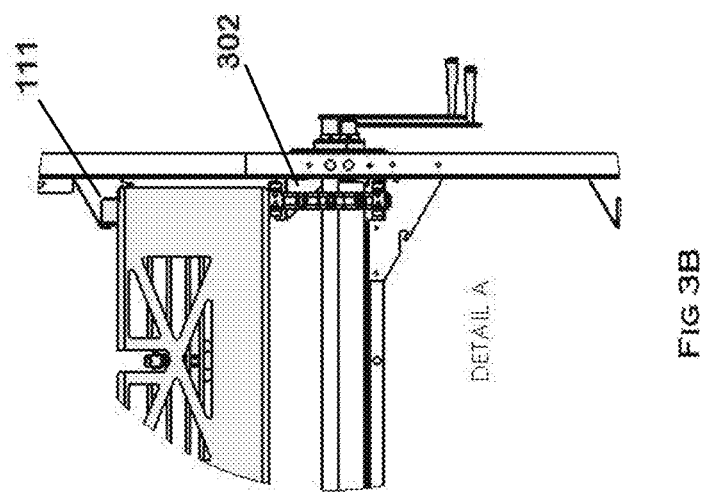
FIGS. 3A-3B is a colony basket rack.
Figure 3A:
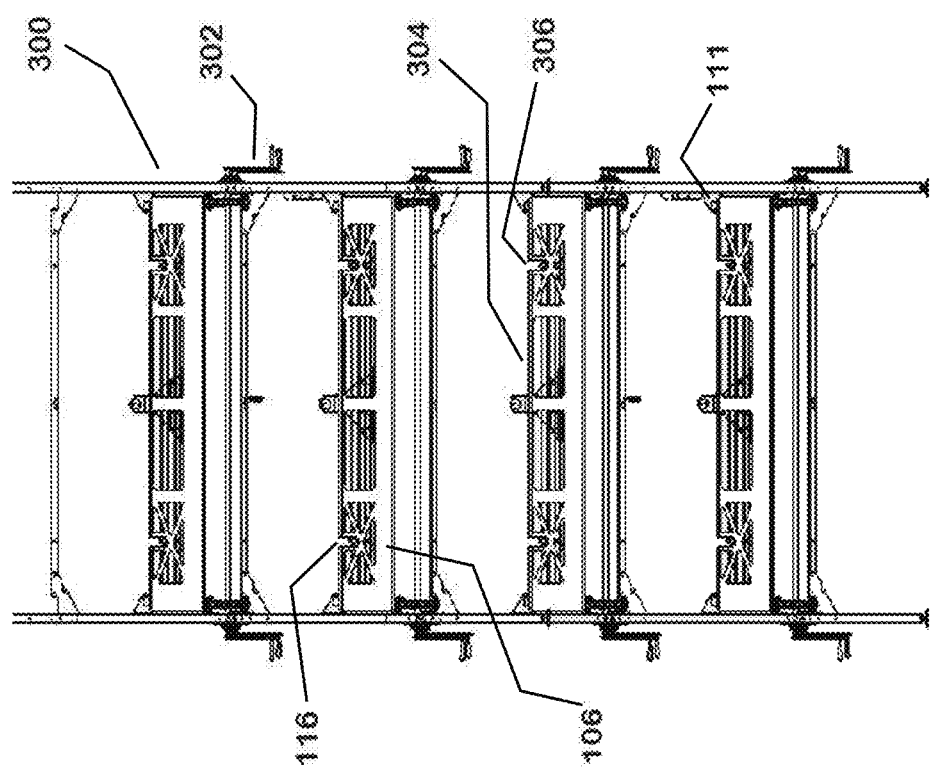

Referring to FIG. 3, a colony basket rack is shown. A rack assembly 300 is shown and configured for a colony system. The rack transfer and conveyor assembly 302 is shown which is utilized to support the colony basket as well as transfer the colony basket into and out of the colony racks of the colony system. The colony system configuration is shown with a feed assembly 304 and a watering assembly 306. The slot 116 shown where the water assembly 306 can be lowered therein. The feed assembly 304 and the water assembly 306 is shown in a lowered position but can be elevated above the colony basket using a wench system adapted to raise and lower the assemblies so that the basket can be inserted and removed from the colony basket rack without being obstructed by the assemblies. Other drawer designs are not adapted such that watering and feeding assemblies can be raised above or lowered into the container.

Referring to FIGS. 4A through 4E, a colony basket rack assembly is shown, a side plan view of a colony basket is shown, a side plan view of a colony basket is shown, a colony basket rack support is shown and a colony basket rack conveyor assembly is shown. FIGS. 4A-4E show the various components of the rack assembly 300 within the colony system configuration. The colony baskets are longitudinally installed within the rack assembly 300. The longitudinal installation aligns the vertical slots of the colony baskets to be aligned with the water trough system. The components of the transfer system including the support transfer rack 400 and the rack transfer conveyor assembly 302 is also shown. A standoff 111 is shown protruding vertically upward from the basket. The bottom facing rim can have a recess for receiving the standoffs.

Referring to FIGS. 5A-5B, a colony basket rack support is shown and a colony basket rack conveyor assembly is shown. FIGS. 5A and 5B show further detail of the support transfer rack 400 and the rack transfer conveyor assembly 302. The rack transfer conveyor assembly 302 includes a conveyor belt 500 and a conveyor roll assembly 502. The rack transfer conveyor assembly 302 also includes a hydraulic cylinder extension arm 504 that can be utilized to engage the baskets with engagement members 506 and extend to transfer a colony basket stack from one rack to another and/or from one rack to a transport system. The basket cylinder arm and basket retention bar can be actuated to longitudinally extend and retract during retrieval and insertion of a basket. The basket retention bar can include basket engagement members that engage the basket by applying lateral pressure against the side of the basket and/or engages a complimentary receptor configured to receive the engagement member. The retention bar and engagement member can be rotated about pivot 508 in order to rotate upward to engage a basket or to rotate outward and downward away from the basket. The support transfer rack 400 can support a basket and the support transfer rack can be integral with a rack allowing the transfer rack 400 to elevate or lower the basket with the rack when it is supporting a basket.

Figure 6:
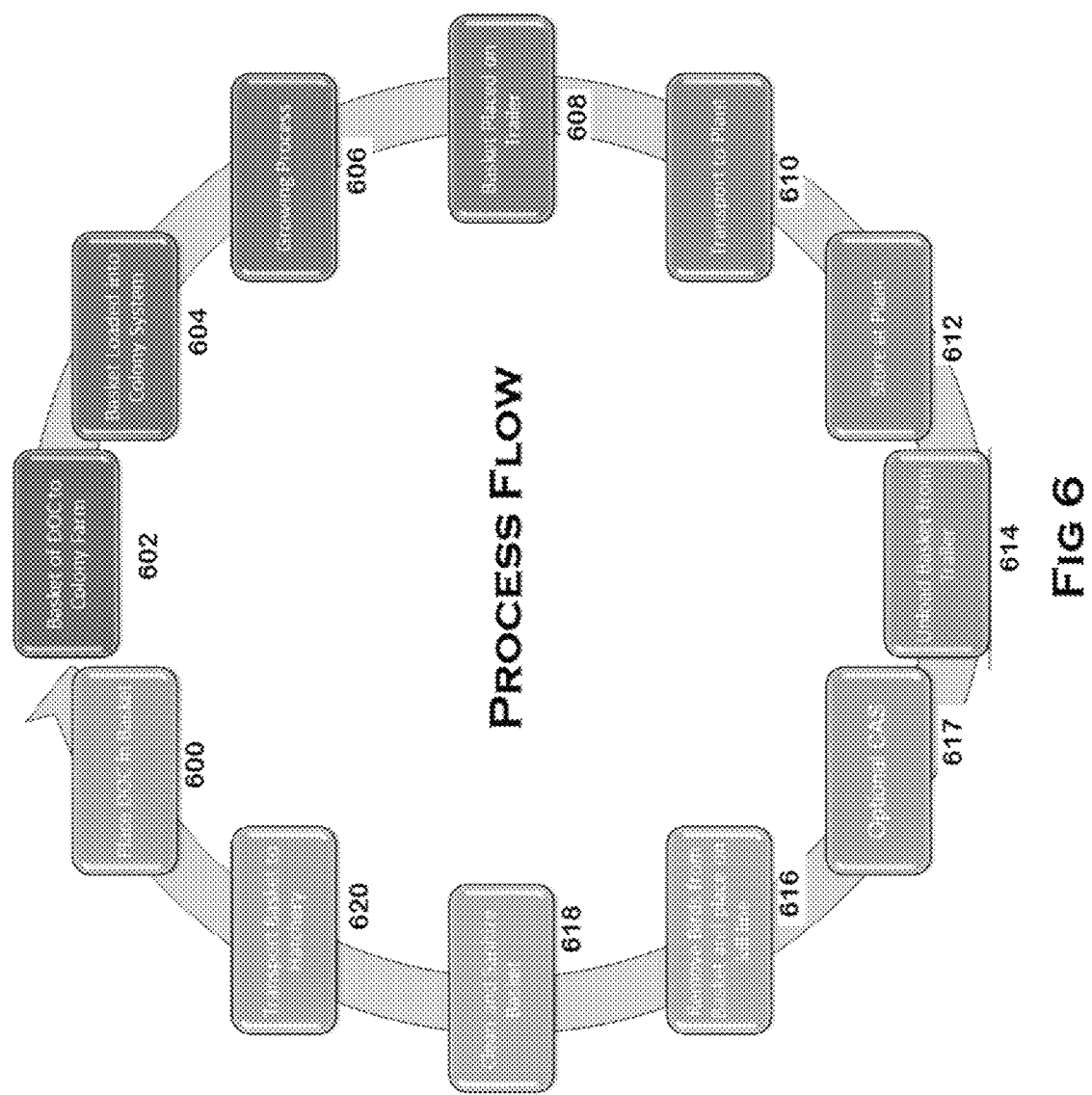
FIG. 6 is a flow diagram of the colony basket methodology.

Referring to FIG. 6 a flow diagram of the colony basket methodology is shown. FIG. 6 shows a flow diagram of a circular process utilizing a system of colony baskets throughout the entirety of the process. A given colony basket will retain the same colony (grouping) of birds throughout the process. Initially a colony basket is filled with DOC at a hatchery as reflected by step 600. Groupings of colony baskets each containing their own individual grouping of birds are then transferred to a growing house (colony farm) 602 where the baskets are loaded into a colony system as reflected by 604. The birds are retained in the same colony basket in which they were originally installed throughout the growing process and the growing process proceeds as reflected by 606. The colony baskets are integrated with the watering and feeding systems within the colony system of the growing house. Once the growing process has been completed, the birds are retained in their original colony basket and the baskets are removed from the colony system and transferred to the trailer of a transport as reflected by step 608. The transport carries the grouping of baskets to a processing plant where the colony baskets are stacked and stored for future processing as reflected by steps 610 and 612. Again, each of the grouping of birds are retained in their original colony basket throughout the process. The baskets are unloaded as reflected by step 614 and transferred to the kill line as reflected by step 616 or 617 which is the controlled atmosphere stunning system (CAS) path and there can be separate paths that can be chosen. The birds can be removed from the original baskets in which they were placed and installed on shackles for further processing. The baskets can then be sent through a cleaning process as reflected by step 618. The cleaned baskets can then be transported to a hatchery 620 and a new batch of DOC can be installed into the baskets and the process can repeat itself.

Figure 7:
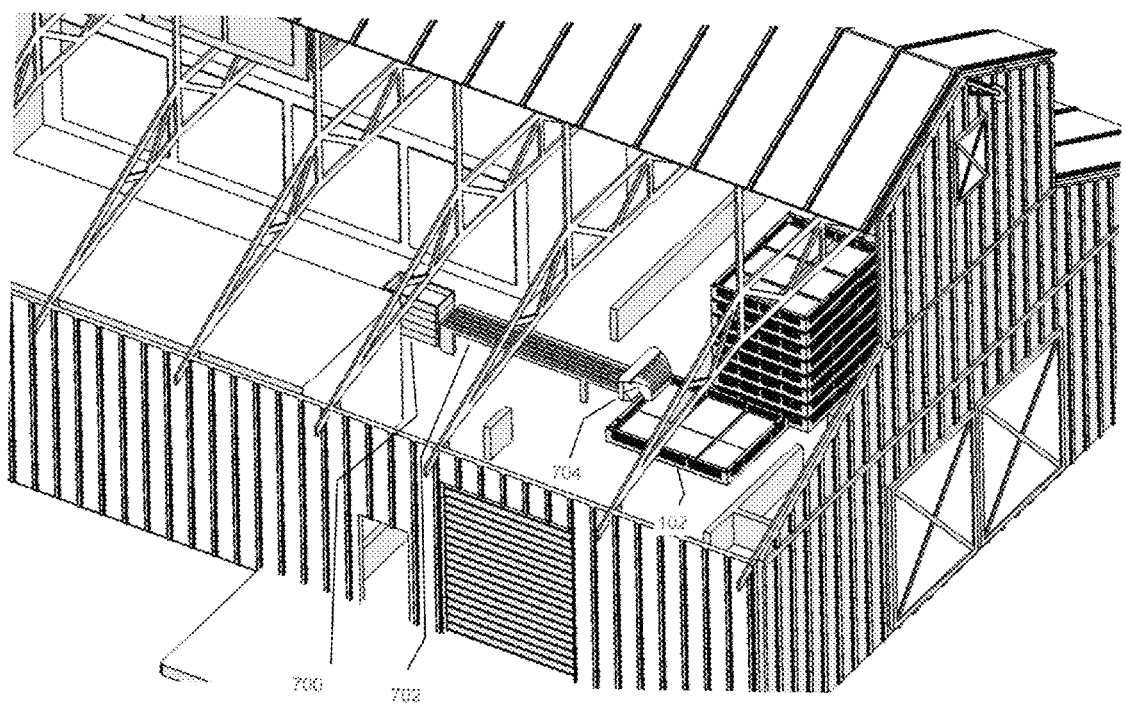
FIG. 7 is an illustration of the hatchery conveyor, DOC counter and egg shell separator.

Referring to FIG. 7, an illustration of the hatchery conveyor is shown. FIG. 7 is an illustration of a hatchery system where groupings of DOC 700 can be placed on a conveyor system 702 and transferred into colony baskets by a transfer system 704 and the baskets filled with DOC can then be stacked and transferred to a growing house containing a colony system. The transfer system 704 installs the DOC in a basket and separates the DOC from the shells that remain after the bird hatches.

Figure 8:
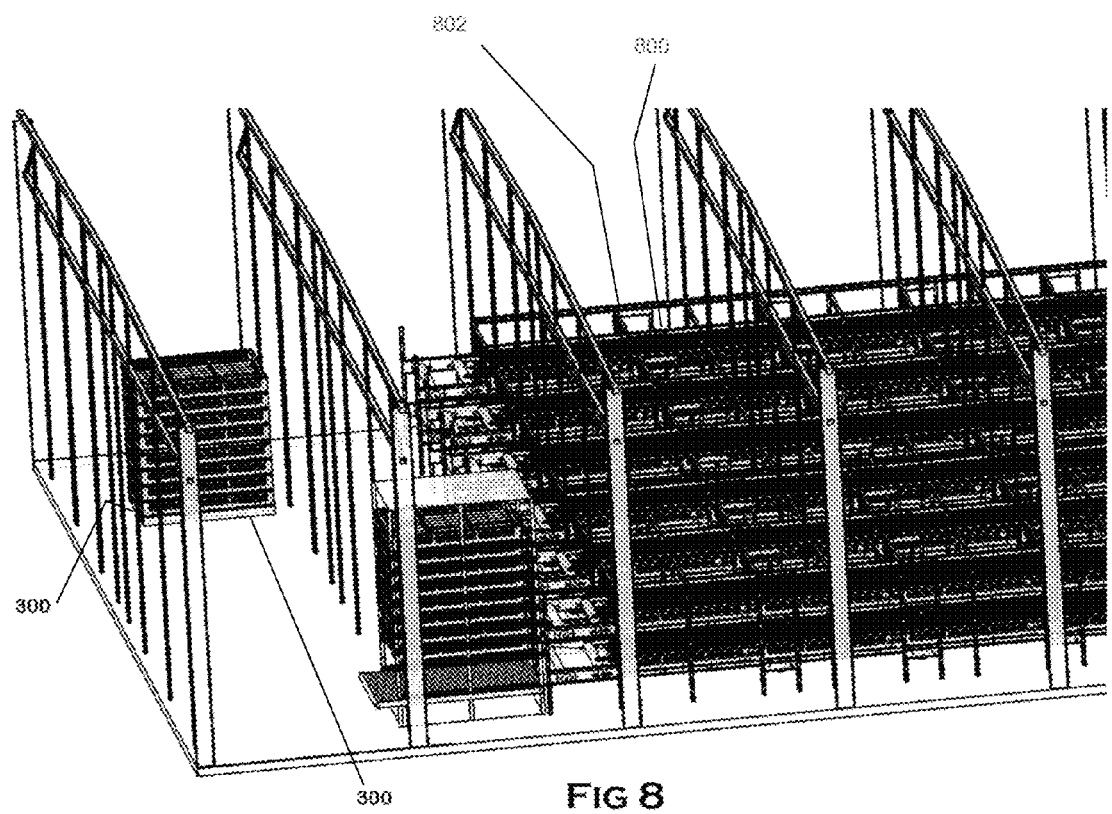
FIG. 8 is an illustration of a colony system.

Referring to FIG. 8, an illustration of a colony system is shown. FIG. 8 is an illustration of a colony system where rows of rack assemblies 800 and 802 are aligned side-by-side in which colony systems are installed as reflected by Items 800 and 802 respectively. A rack assembly 300 can be utilized for transferring the colony baskets from the rack to the colony system. The colony baskets can be longitudinally installed within the colony system for the growing process. The colony basket stacks 200 can be installed on wheeled platforms for transporting the colony baskets stacks as reflected in the illustration.

Figure 9:
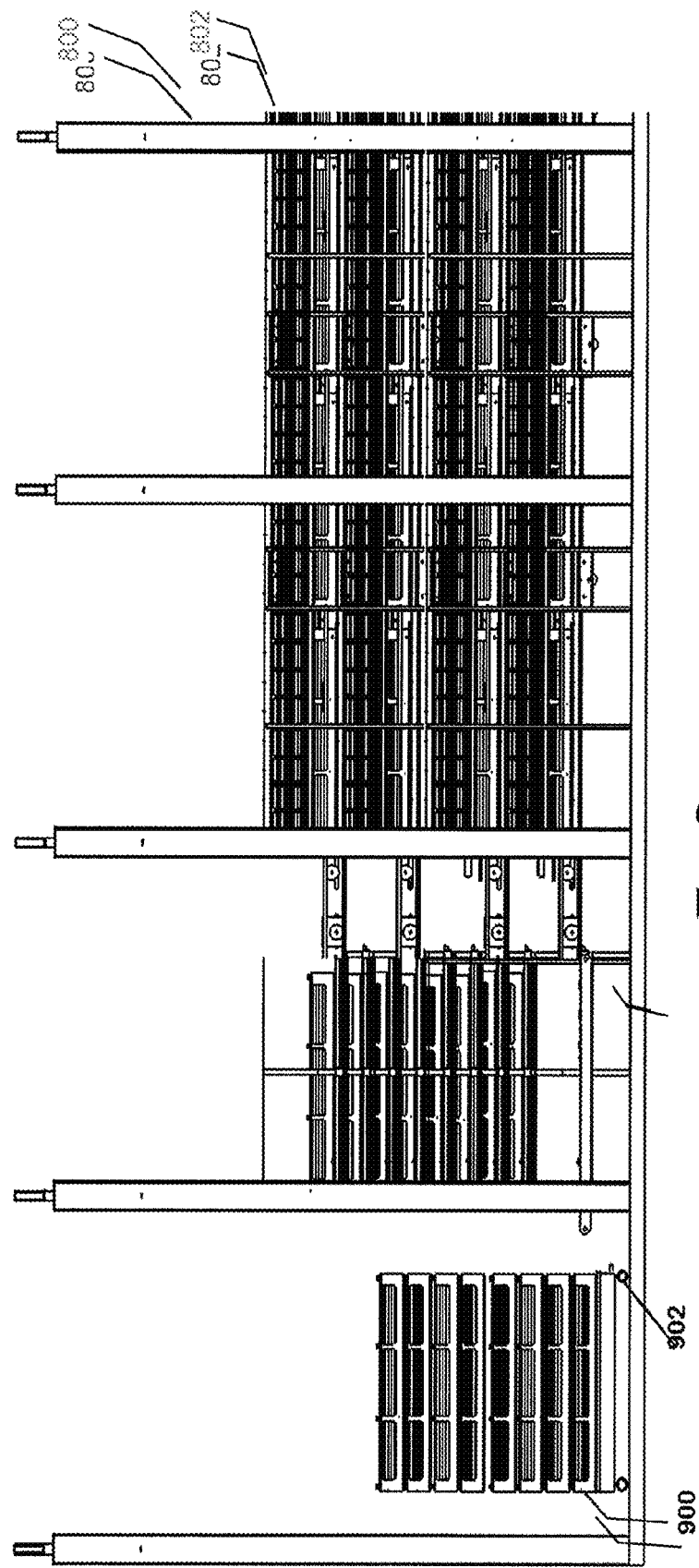
FIG. 9 is an illustration of loading colony baskets from a rack to a colony system.

Referring to FIG. 9, an illustration of loading colony baskets from a rack to a colony system is shown. FIG. 9 is a further illustration of transferring a colony basket stack 900 on a wheeled platform 902 to a colony rack for insertion of the colony baskets into the colony system as reflected by Items 800 and 802.

Figure 10:
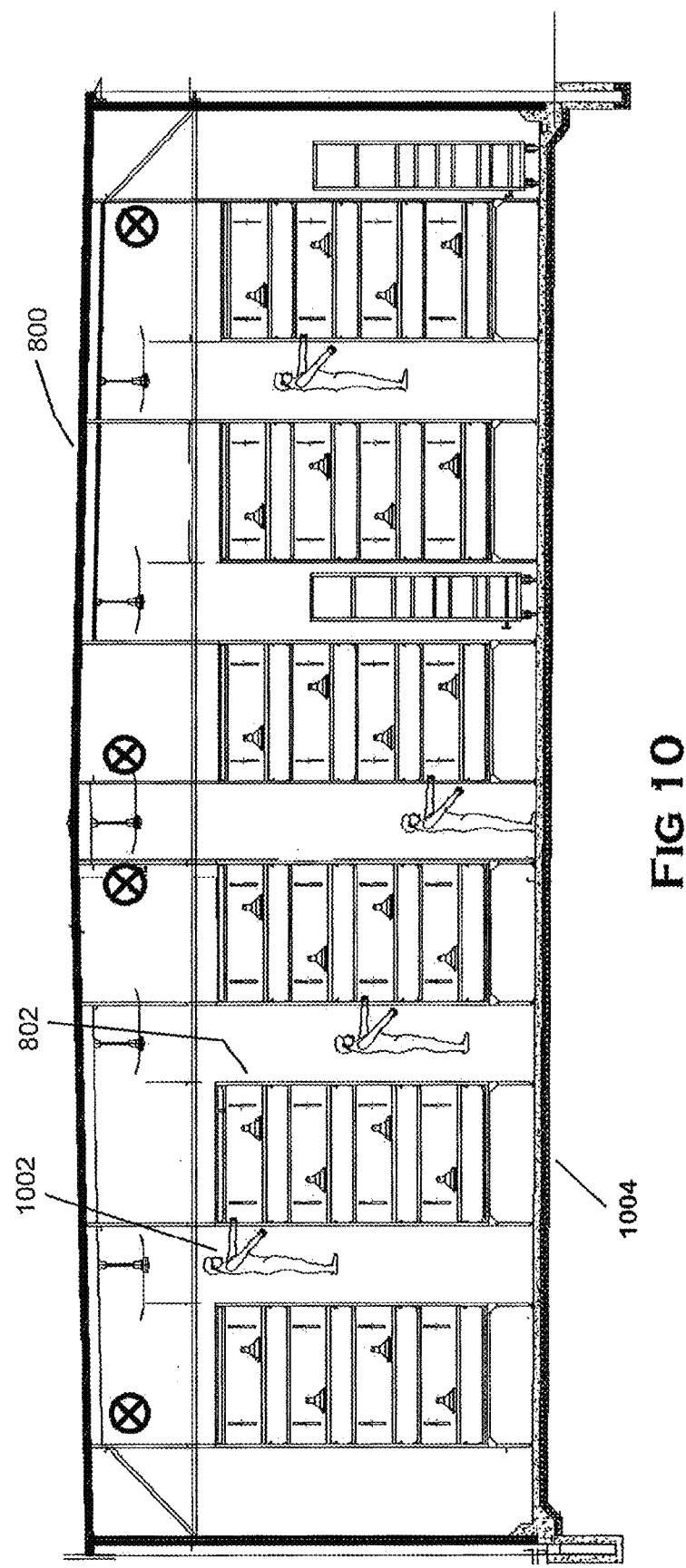
FIG. 10 is an illustration of the colony system operation.

Referring to FIG. 10, an illustration of the colony system operation is shown. FIG. 10 is an illustration of the growing process in operation whereby workers 1002 utilizing platforms 1004 can tend to the growing process by maintaining the watering and feeding systems. The water and feed assemblies are shown in an elevated position above the basket. When the assemblies are elevated, the baskets can be readily inserted and removed.

Figure 11:
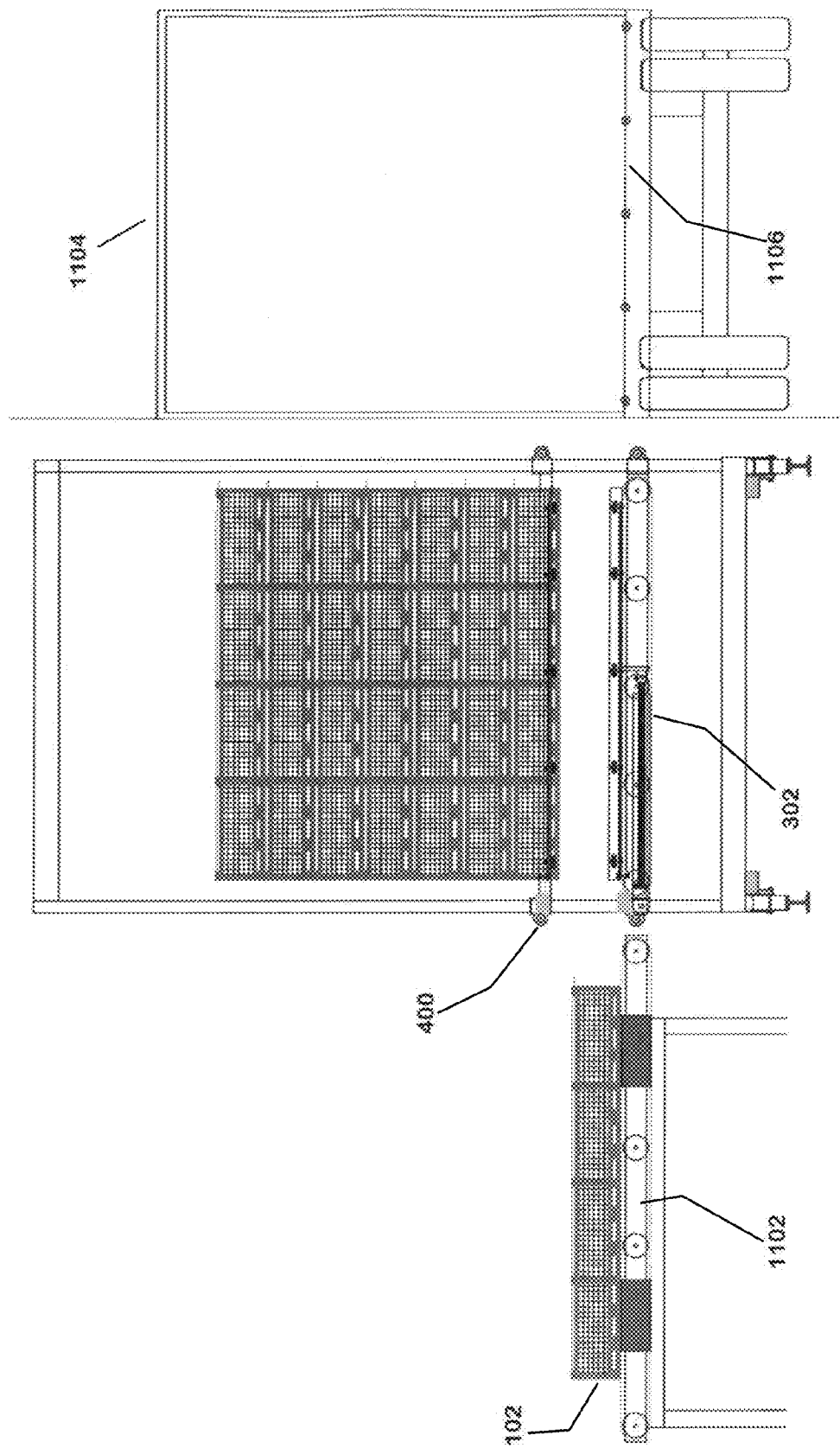
FIG. 11 is an illustration of a transport loading system.
Figure 12:
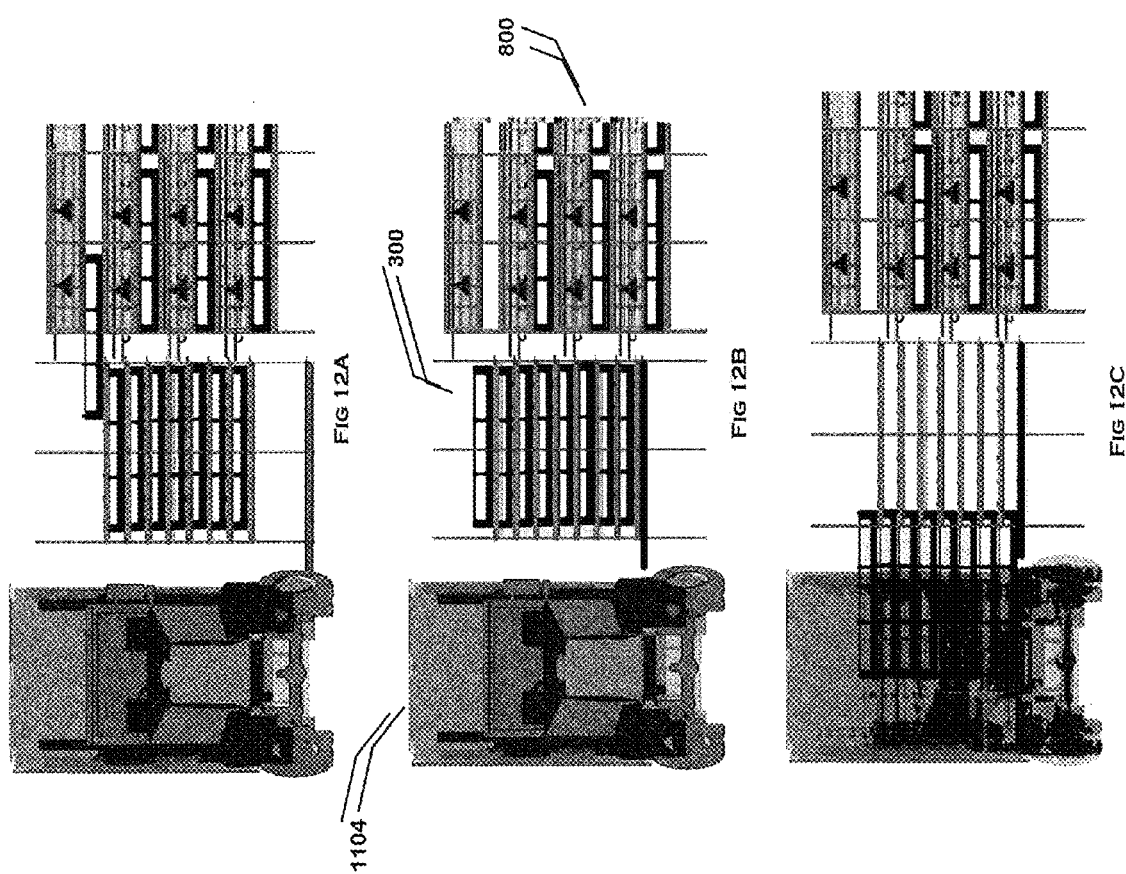
FIG. 12A-12C is an illustration of loading a transport.
Figure 13:
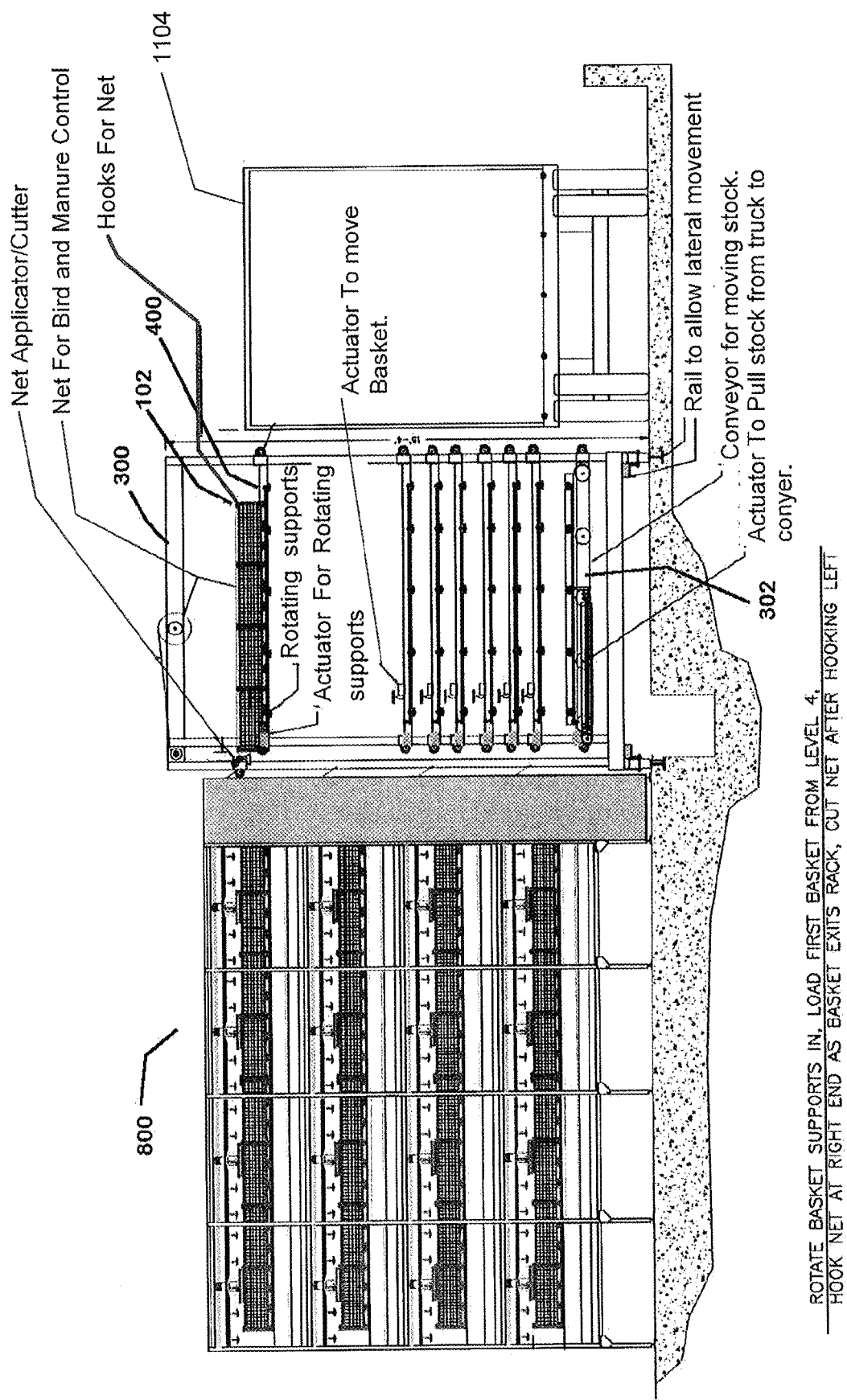
FIG. 13-19 is an illustration of transferring colony basket stacks from a colony system to a trailer.

Referring to FIG. 11, an illustration a transport loading system is shown. FIG. 11 is an illustration of transferring colony baskets 102 from a colony system into a rack assembly for transfer into the transport 1104 having a flatbed 1106. The colony baskets 102 can be transferred by a transfer conveyor 1102 into a rack assembly. The rack assembly can then be utilized to load the transport 1104 by placing the colony basket stacks on the flatbed of the transport.

Referring to FIG. 12A-12C, an illustration of loading a transport is shown. FIGS. 12A-12C is a further illustration of transferring colony baskets from the colony system onto a rack assembly for placement on a flatbed of a transport.

Figure 14:
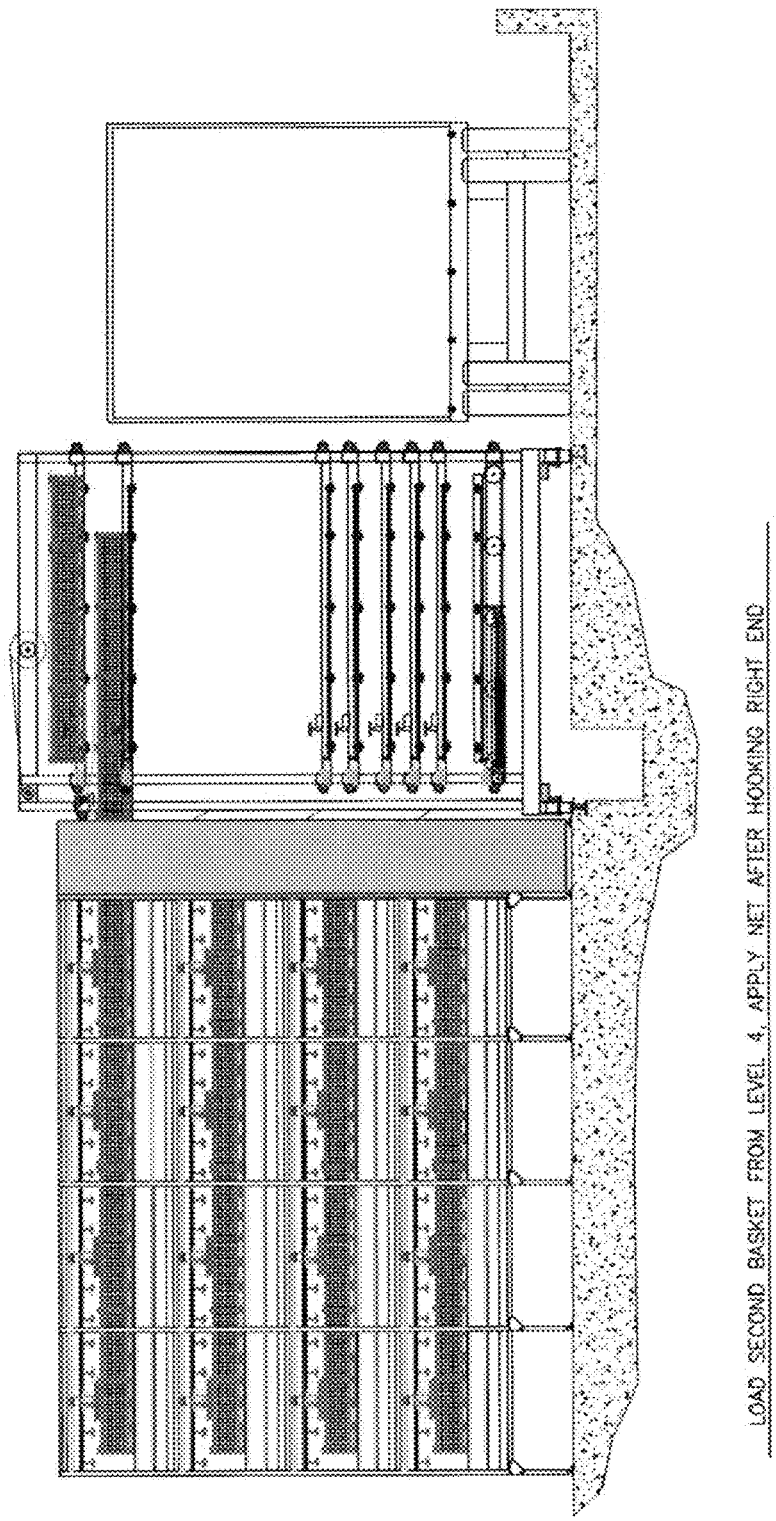
Figure 15:
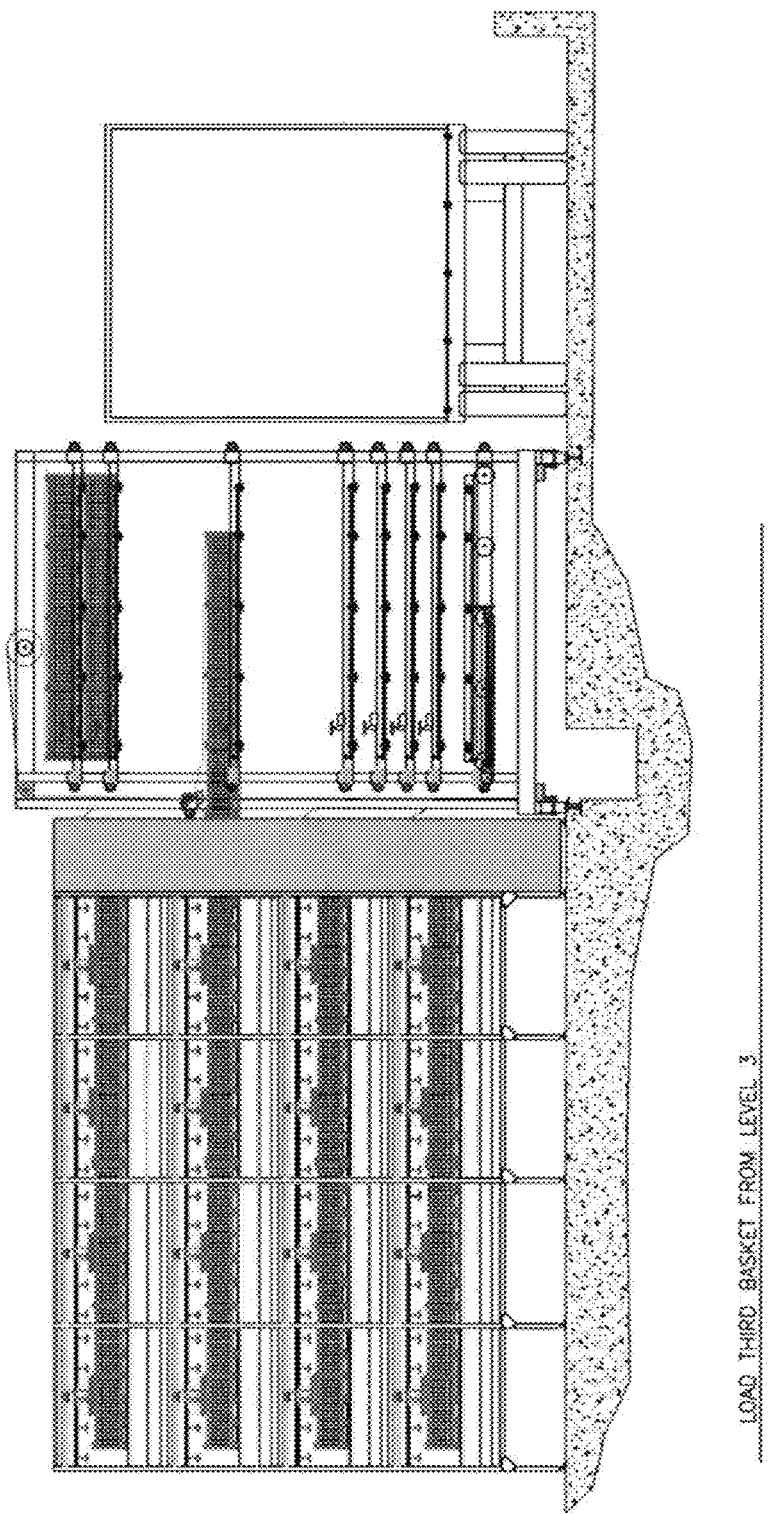

Referring to FIG. 13-19, an illustration of transferring colony basket stacks from a colony system to a trailer is shown. FIGS. 13-19 provide an illustration of a step-by-step process for transferring colony baskets from the colony system onto the flatbed of a transport. As illustrated, the support transfer rack 400 are rotated to receive the first colony basket from level 4. The basket is loaded onto the basket support and a netting material 1302 can be installed or draped over the top of the colony basket 102 to retain the birds therein. FIG. 14 illustrates loading a second basket from level 4 and again applying a netting or other covering material over the top of the basket. FIG. 15 illustrates loading a third basket from level 3 and again applying the netting material and draping over the top of the basket. This process is repeated for each of the levels of the colony system as two baskets are loaded from each level and then stacked with the previously loaded baskets.

Figure 16:
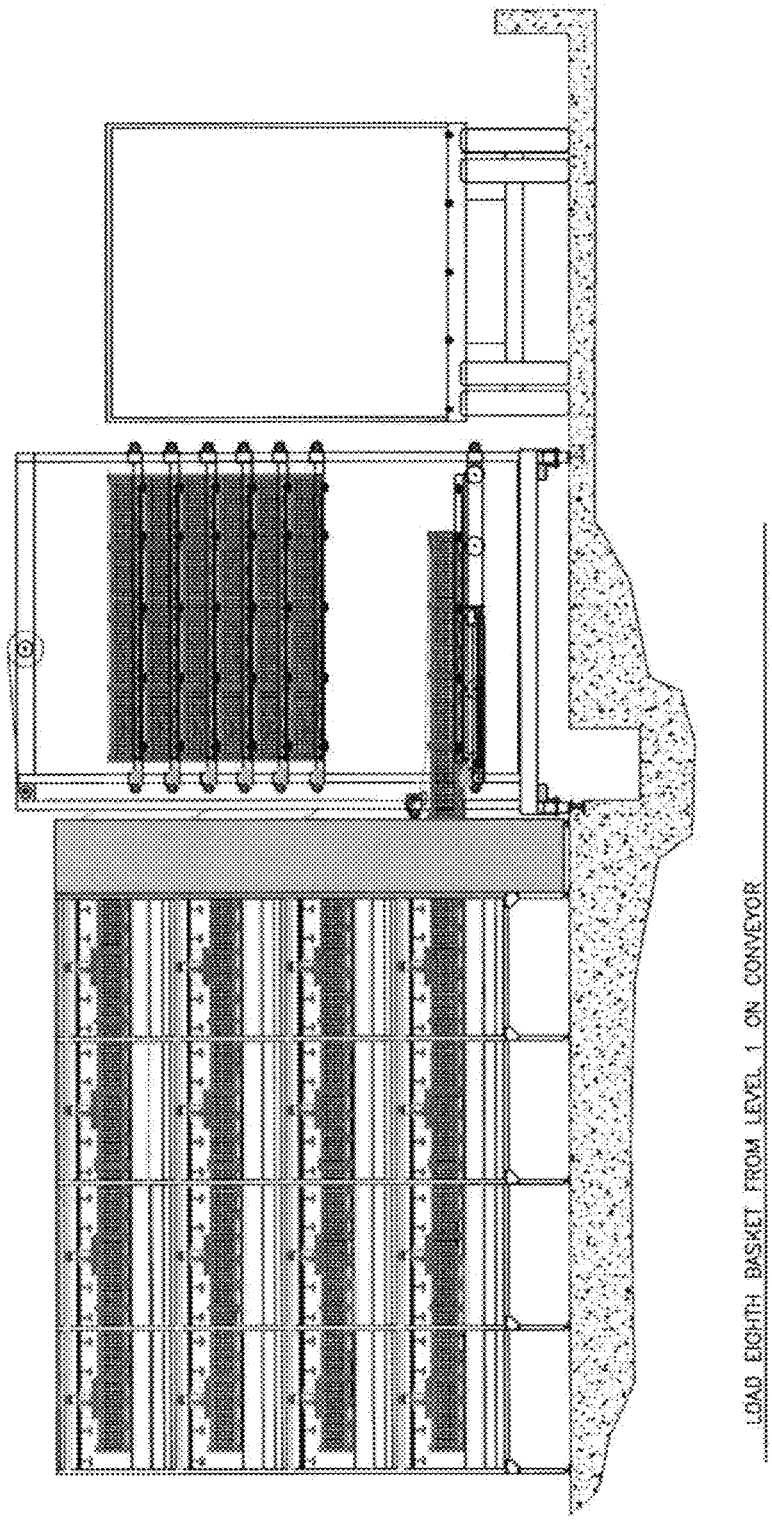
Figure 17:
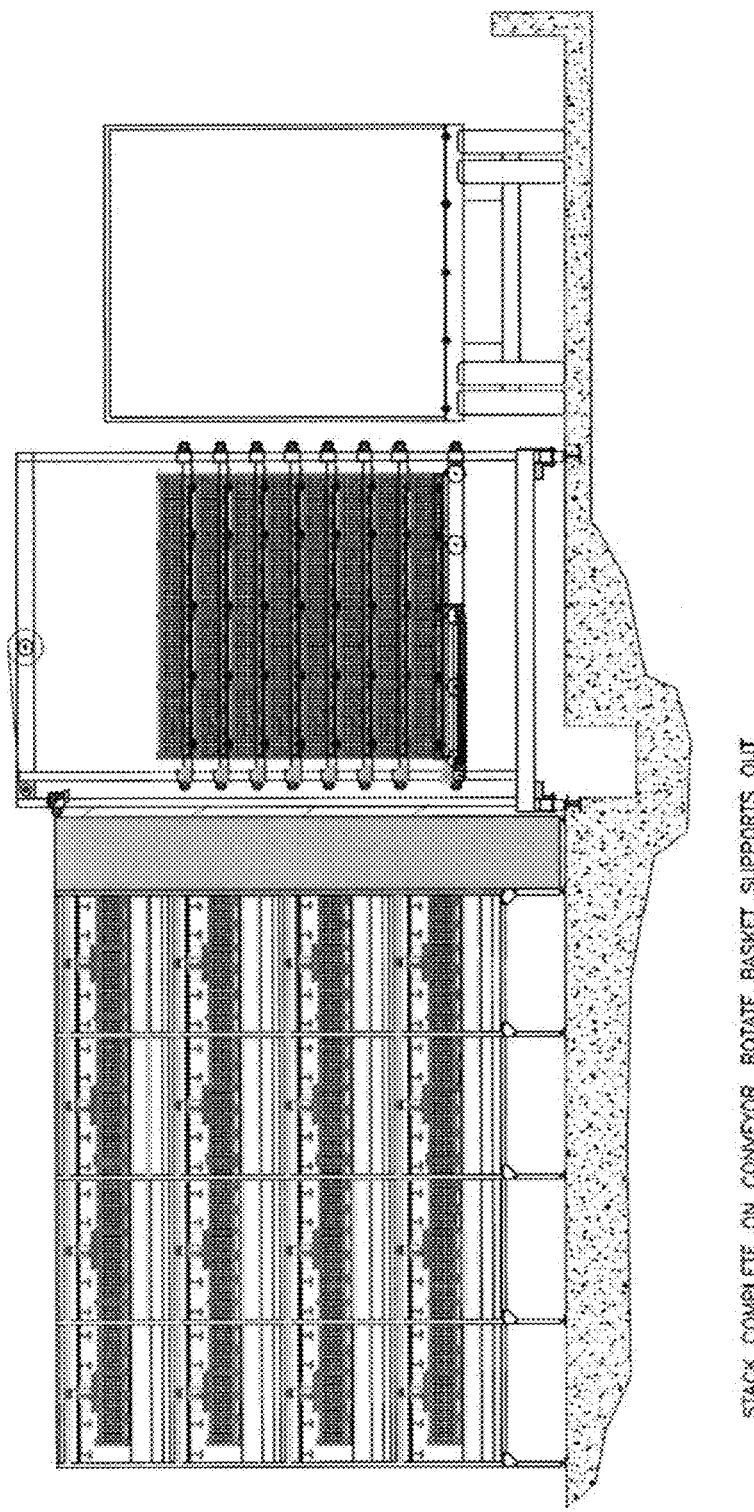
Figure 18:
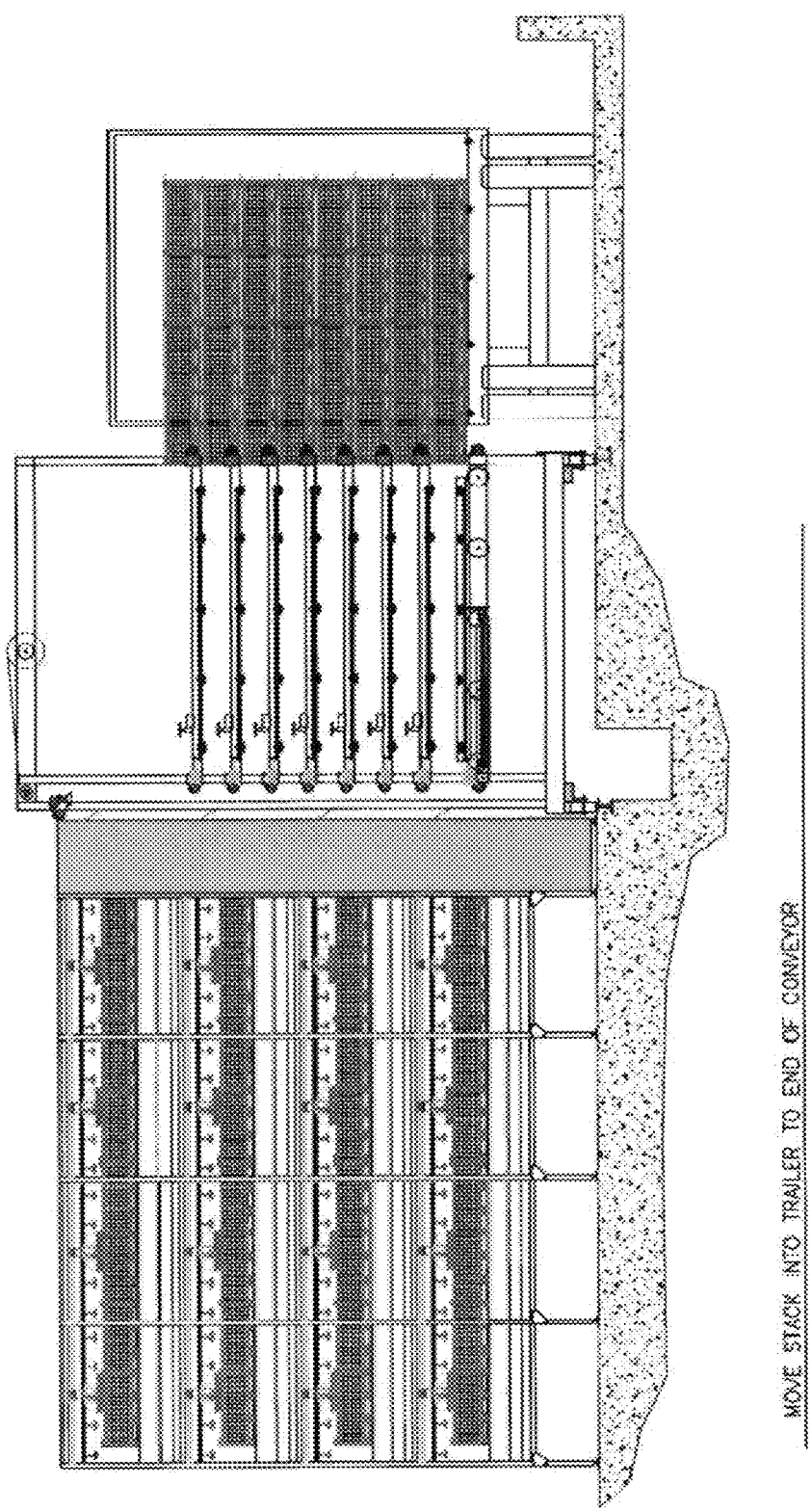
Figure 19:
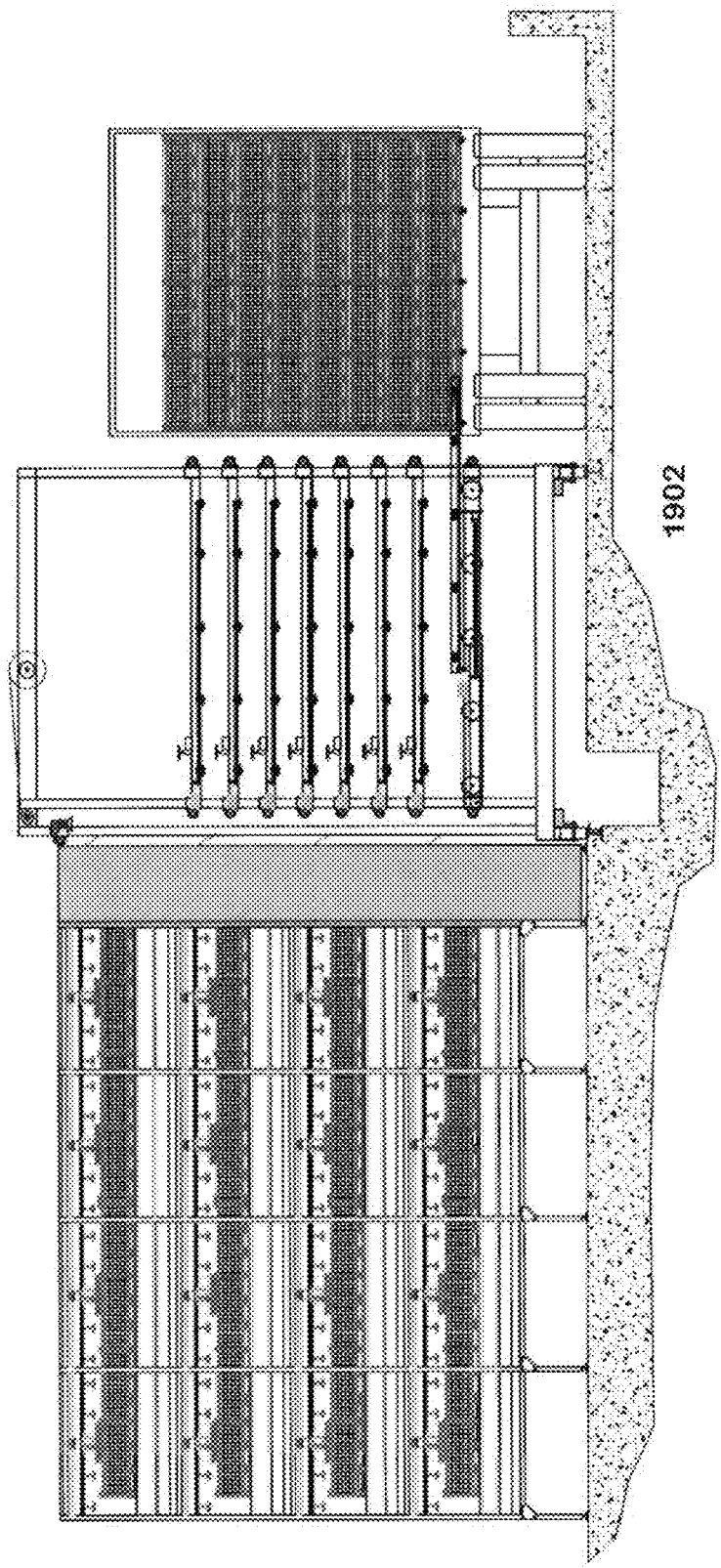

FIG. 16 reflects loading the eighth and final basket from level 1 onto the rack transfer conveyor assembly for subsequent stacking of the colony baskets. When a complete stack has been loaded, the basket supports can be rotated outward such that the rack transfer conveyor assembly can begin transferring stacks onto the transport. FIG. 17 illustrates the completed stack and ready for rotating the basket supports outward to ready the loading of the basket stacks onto the transport. FIG. 18 illustrates the rack transfer conveyor assembly conveying the basket stacks onto the flatbed of the transport. FIG. 19 illustrates the completion of the stack loading utilizing the hydraulic cylinder extension arm for placing and loading the stack onto the flatbed of the transport.

Figure 20:
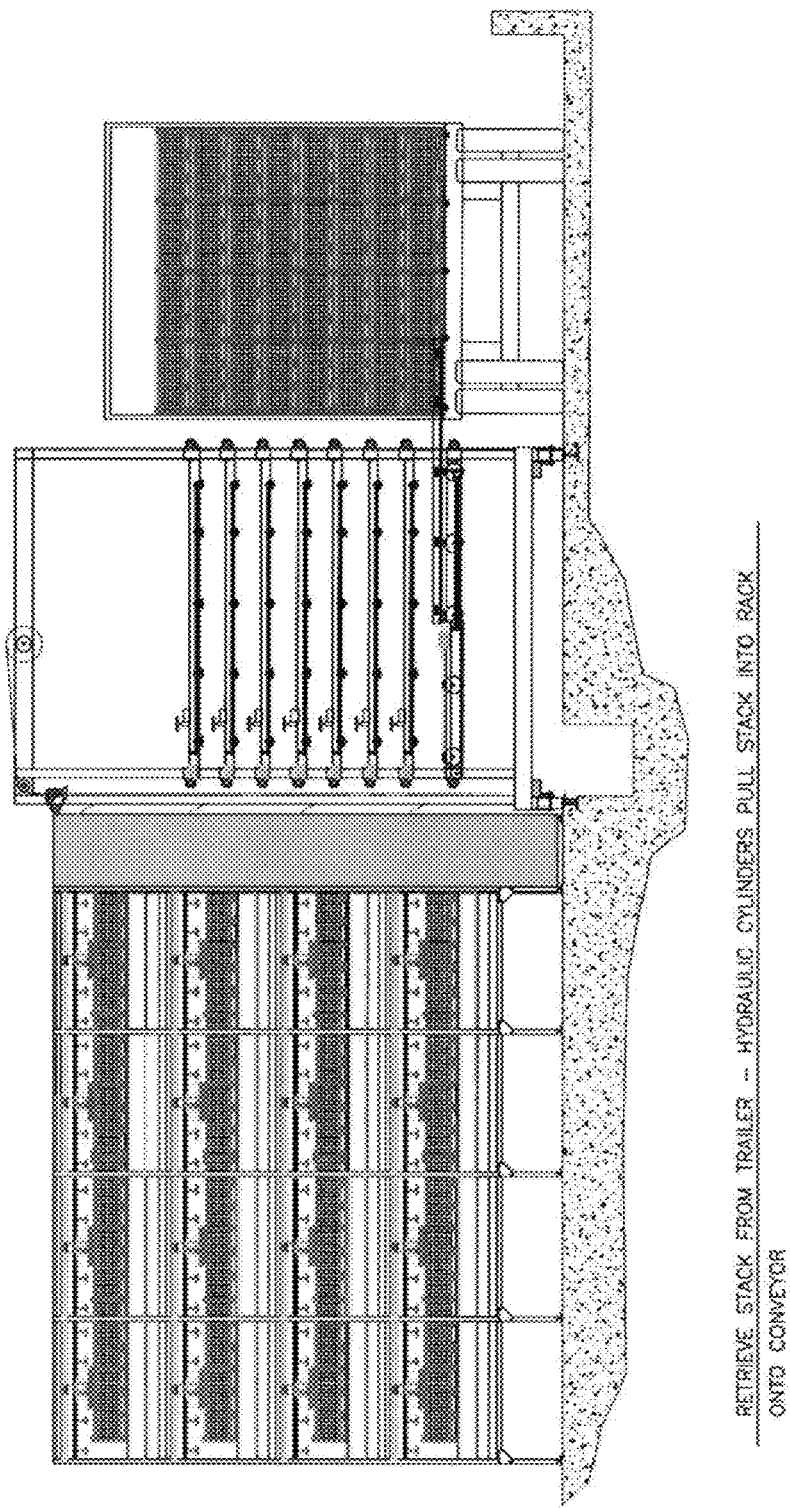
FIGS. 20-22 is an illustration of retrieving colony basket stacks from a trailer.
Figure 21:
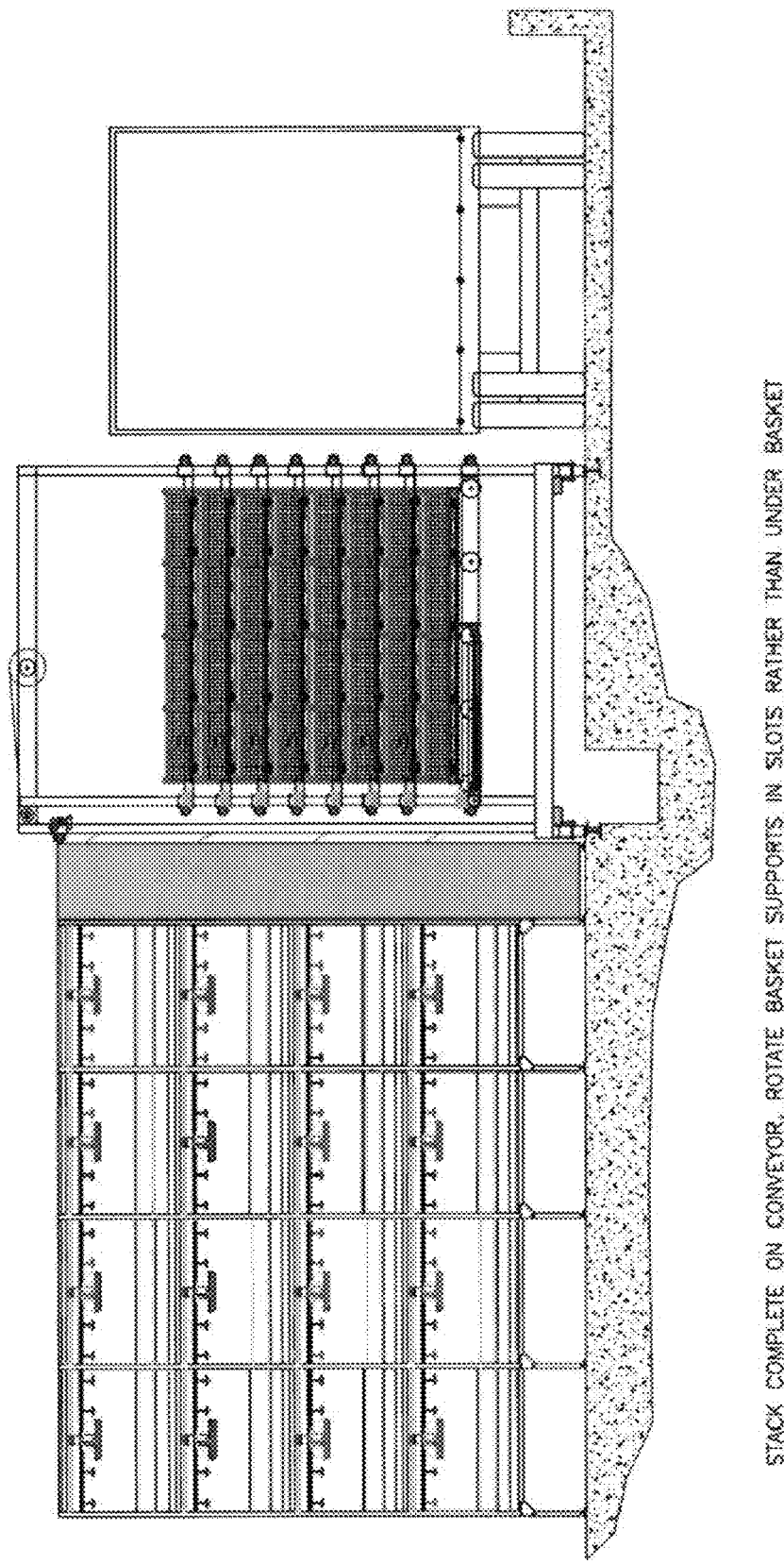
Figure 22:
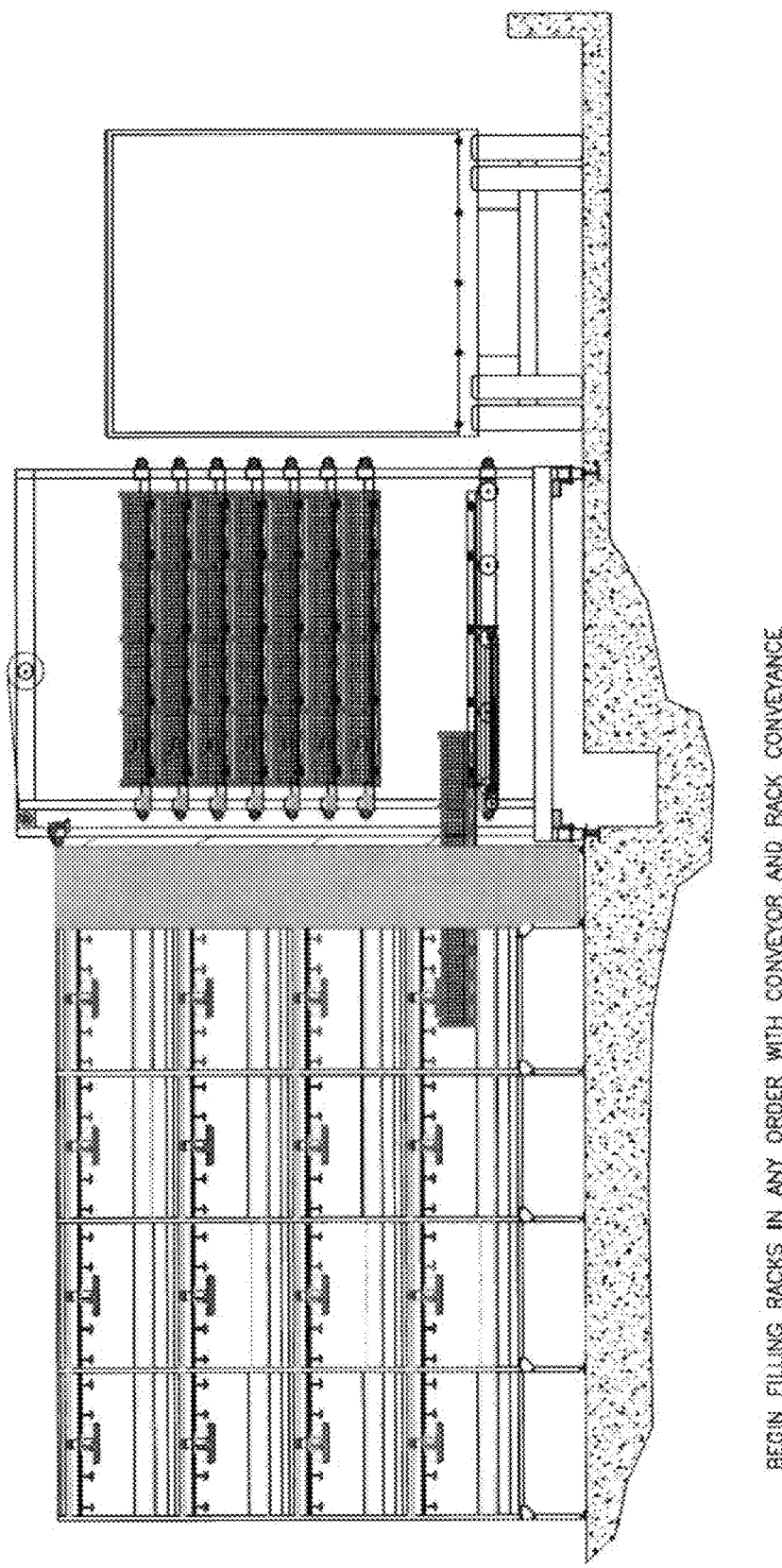

Referring to FIGS. 20-22, an illustration of retrieving colony basket stacks from a trailer is shown, which is essentially the reverse of the process for loading a trailer. FIG. 20 is an illustration of subsequently retrieving the basket stacks from the trailer using the hydraulic cylinder arm to engage and pull the stack onto the rack assembly. The hydraulic cylinder arm pulls the stack onto the rack and onto the conveyor for subsequently engaging the support transfer racks for installing and longitudinally inserting the basket into the colony system. FIG. 21 illustrates the beginning of the process for transferring the basket stacks into the colony system. The transfer support racks can be rotated to engage the colony baskets to begin the process of transferring the baskets into the colony system. A reversal of the previous process can be performed by installing two colony baskets per level, beginning with level 1 and moving upward to level 2, 3 and 4. FIG. 22 is an illustration of this process.

Figure 23:
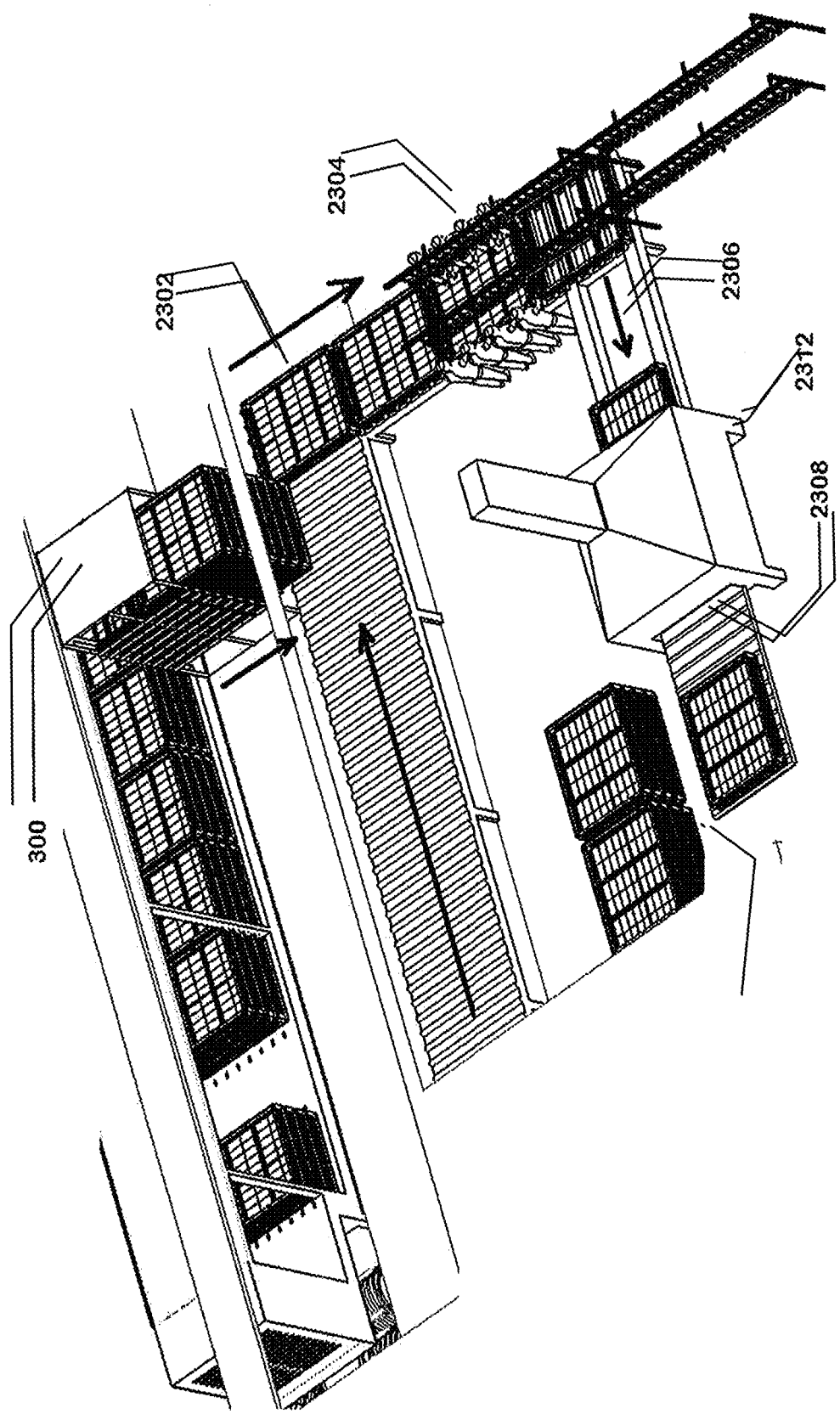
FIGS. 23-24 are illustrations of transferring colony baskets to a kill line.
Figure 24:
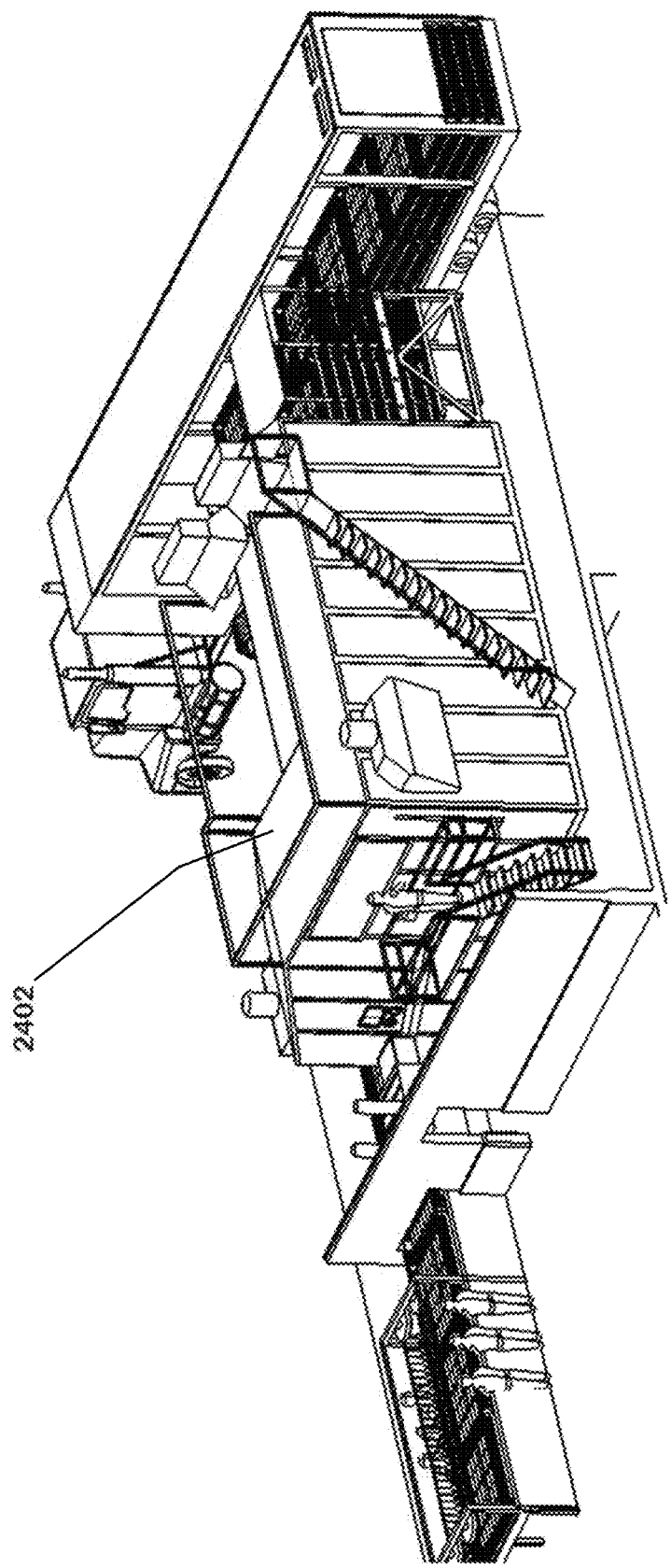

Referring to FIGS. 23-24, illustrations of transferring colony baskets to a kill line are shown. FIG. 23 is an illustration of transferring the colony baskets from the transport to the rack assembly 300 and then transferring the colony baskets onto the colony basket entry conveyor 2302 to convey the colony baskets to the rendering station 2304.

Once the birds have been unloaded from each colony basket, the empty colony baskets can then be transferred to the colony basket exit conveyor 2306. The colony baskets can then proceed through and along the colony basket wash conveyor 2308 which carries the colony baskets through the colony basket washer 2312. The colony baskets once they are washed can then be reconfigured in a colony basket stack where the process can be started again.

FIG. 24 is an illustration of a colony basket entry station 2402 which is another embodiment for transferring the colony basket stacks from the transport to the rendering station.

Figure 25:
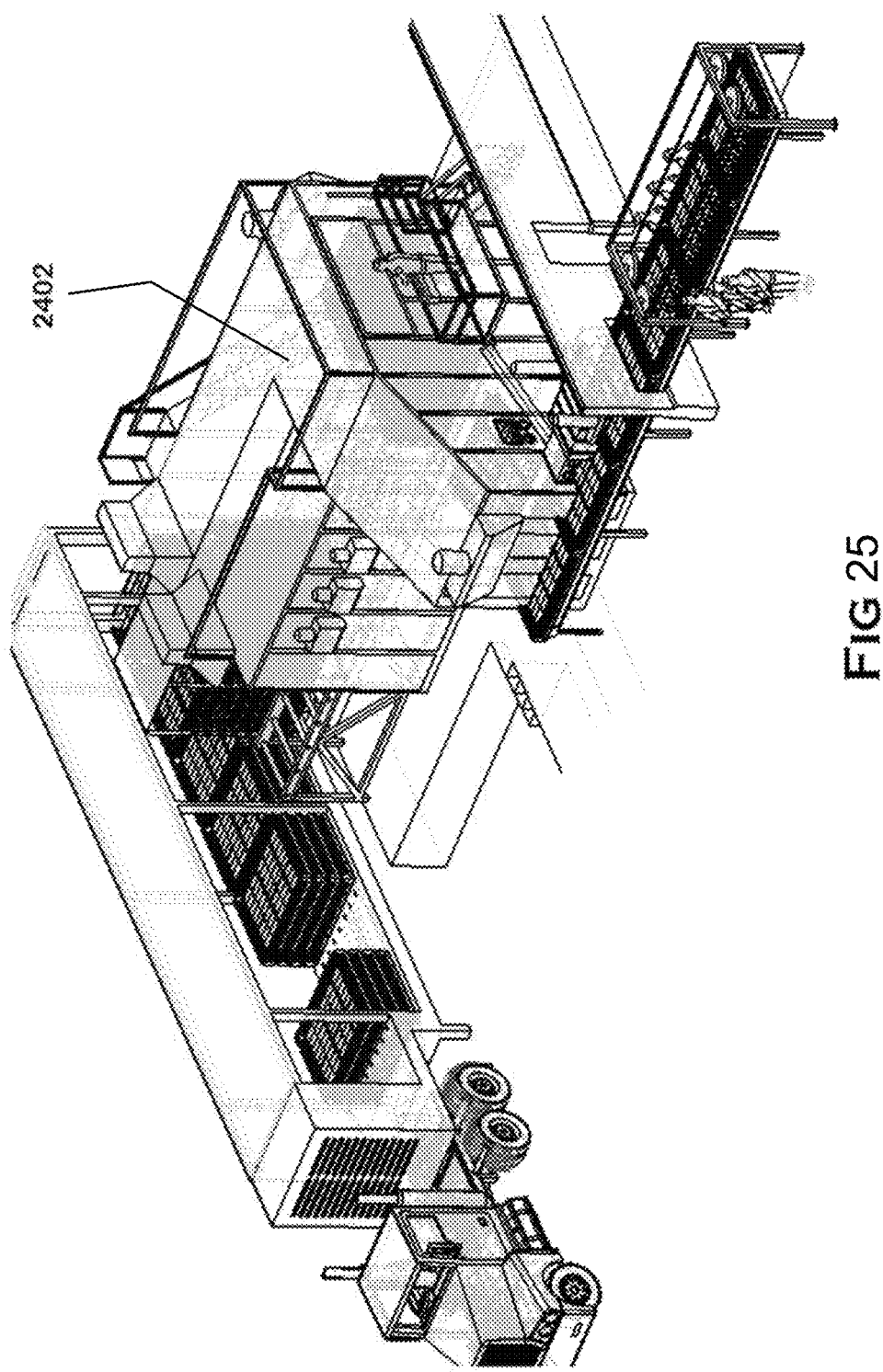

Referring to FIGS. 25-26, an illustration of colony baskets traveling through the kill line and the cleaning station is shown. FIG. 25 is a further illustration of the rendering or kill line whereby workers remove the birds from the colony baskets and hang the birds on the hanging conveyor shackles 2502.

The process can begin at the hatchery where a grouping of birds (for example DOC) are gathered and placed into a colony basket. A plurality of baskets can be stacked on over top of another for transport. A netting material can be shrouded over each colony basket to assist in containing the birds. The grouping of birds and their respective colony basket in which they are placed can remain in the same colony basket throughout the process until they are removed as broilers at the kill station. This reduces the handling of the birds to avoid injury and helps to prevent the spread of bacteria or disease between bird groupings. The grouping of DOC can be transported to a growing house in the same colony basket in which they were originally placed at the hatchery, where the poultry are grown for future processing. At the growing location there can be a series of growing colony racks for housing the colony baskets with the original grouping of birds placed therein at the hatchery. At the growing facility, the colony baskets can be integrated with water and feed channels and watering and feed troughs. The colony baskets can have a specific configuration to integrate with the watering and feeding systems as outlined herein in order to assist poultry going through the growth process and assist the operators at the growing facility for attending to the birds. When the poultry have completed the growth process, now in the broiler stage, they can be transported to a location for processing as a final food product. A transport can arrive at the growing location to receive the poultry that have completed the growth process. The transport system can be a truck and trailer combination. The trailer can be a standard flatbed trailer on which colony baskets containing the fully grown poultry can be loaded. The colony baskets containing the original grouping of birds, or some subset thereof, can be transferred from the colony racks of the colony system to the flatbed of the transport. A netting material can be shrouded over each basket before it is stacked in order to assist in retaining the bird. The colony baskets can be stacked one atop another. The transport can be loaded with the fully grown birds and transported along a travel route to an unloading station at a processing facility. The transfer system for transferring the colony baskets from the colony racks to the flatbed can be automated as described herein.

The unloading station can include an automated unloading system for automatically unloading a colony basket stack from the trailer for storage in an adjacent storage area of the processing facility. Tray stacks can be conveyed to a storage location having a climate controlled storage facility for housing the poultry in the stacked configuration prior to the rendering process. The storage area can be operated on a first in first out system such that a given colony basket stack does not dwell in the storage area for an extended period of time. The storage area can also have a system for controlling and tracking the weight of the tray stacks which could ultimately provide weight information regarding the fully grown poultry.

Within the storage facility there can be an automated unstacking system for unstacking the colony basket stacks for conveyance through the processing facility. There can be a stunning system utilized including a gaseous environment for stunning the poultry or it can include an electric shock stunning system or a combination of the two. If a gaseous environment stunning system is utilized, the gaseous environment can be a multi-stage stunning system where the first stage(s) can be a combined induction phase and the second stage(s) can be the combined stunning phase. This system can generally be referred to as a controlled atmosphere stunning system or CAS. Once the colony baskets containing the original grouping of birds/poultry have transitioned through the stunning system, the poultry can be unloaded from the trays at an unloading station. The unloading station can comprise an automated unloading system which is operable to tilt the colony baskets sufficiently to remove the stunned poultry from the colony baskets. This is the first point in the process that the birds are removed since their original placement into the colony basket at the hatchery as DOC. Once removed from the colony baskets, the stunned poultry can be conveyed to a shackling station where the poultry can be hung from a shackle conveyor for being conveyed to a plant evisceration facility.

As described the colony baskets can be stackable. Further the colony basket can have an interwoven wire mesh elevated floor above the colony basket bottom floor where the mesh openings are sufficiently large for debris to pass therethrough and also providing a means for the bird to grasp hold in order to stabilize itself and the mesh floor can be flexible in order to avoid injury to the birds. The frame of the colony baskets include various portions including perimeter top and bottom rim flanges and upright vented side walls. The upward facing surface portion of the upper perimeter top rim flange can be designed to be complimentary with respect to the downward facing portion of the bottom perimeter rim flange. This complimentary configuration can be designed such that the trays interlock when they are stacked thereby resisting longitudinal and latitudinal movement of the trays with respect to each other.

The stackable tray can be constructed having a top rim flange and a bottom rim flange, which defines the longitudinal and latitudinal dimensions of the tray. The top and bottom rim flanges can have L-shaped cross sections. The inner perimeter of the top rim flange can define an upper opening or upward facing opening through which birds can be easily inserted. The bottom rim flange defines the perimeter of the lower or downward facing opening closed off by the solid floor. The solid floor can have elevators for elevating the mesh floor proximately above the solid floor. The mesh flooring is designed with vented openings where the openings are sufficiently large to allow debris to pass there through. The flexible mesh floor design provides for a surface that can be grasped by the talons of a bird without injury. Upright side walls can be attached around the perimeter of the tray and attached to support members. The inner perimeters of the top rim flange and the bottom rim flange, which define the upper and lower openings respectively, can have substantially the same geometry.

The top rim flange can include stabilization standoffs which can extend vertically. The top rim flange can have on an upper surface a vertical standoff. The flange and the complementing recessed receptacle on the underside of the colony basket when engaged, one with respect to the other in a stackable fashion, they can resist longitudinal and latitudinal shifting of trays, one with respect to the other. Also, the stabilization standoffs can be placed along the latitudinal and longitudinal sides of the top rim flange. The spacing between the longitudinal, the latitudinal, and the corner upright support ribs define the vented openings of the tray. The spacing between the support members and the height of the support members can be optimized depending on the type of bird being contained within the stackable trays.

For stacked colony baskets the uppermost colony basket can have a top cover or a netting installed of the uppermost colony basket. The top cover can have a mesh screen for covering the opening of the uppermost tray. The perimeter of the mesh screen can be defined by the top cover flange. The top cover flange can have recessed receptacles for interfacing with the raised standoffs of the uppermost tray.

The colony basket stacks can be transitioned to the transport and loaded on the flatbed by way of a transfer rack or loading dock or other means for loading the colony basket stacks. Vertically protruding standoffs can be provided on the flatbed for and dimensioned to be received by the recessed receptacles of the lower most colony basket in a stack. The transport can have a shroud covering for better controlling the environmental exposure of the poultry. The shroud covering can be supported by transport side rails. One or both of the side panels of the shroud covering can be a retractable curtain for exposing the flatbed from either side. The shroud covering can also have a rear transport cover opening and or a side transport cover opening through which colony baskets can be loaded.

The stacked colony baskets can be loaded through the transport cover opening by sliding them along tray tracks which extend along the flatbed. The trailer can be a standard trailer; however, the trailer can have side railings for supporting shroud covering. The top surface of the flatbed can have raised standoffs that conform to the recessed receptacles on the underside of the tray to restrict lateral sliding or movement of the bottom most tray.

The various poultry handling examples shown above illustrate a novel system and method for handling poultry. A user of the present invention may choose any of the above chicken handling embodiments, or an equivalent thereof, depending upon the desired application. In this regard, it is recognized that various forms of the subject chicken handling could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A method for processing poultry using a colony basket comprising the steps of:
   a. gathering at a hatchery together a grouping of birds into a colony basket when the grouping of birds are day old chicks, where said colony basket has at least one vertically upright latitudinal side wall having a vertical slot extending downward into the at least one vertically upright latitudinal side wall;
   b. transporting said same grouping of birds in said same colony basket to a growing house having a colony system including a plurality of colony racks and inserting said same colony basket containing said same grouping of birds in one of said plurality of colony racks;
   c. extending a channel of a sustenance assembly through the vertical slot with said same colony basket having said same grouping of birds, and retaining said channel and in said vertical slot;
   d. transferring said same grouping of birds in said same colony basket to a transport and transporting said same colony basket containing said same grouping of birds to a processing facility;
   e. transferring said same grouping of birds in said same colony basket out of the same colony basket for processing;
   f. emptying and cleaning said colony basket; and
   g. transporting the emptied colony basket to the hatchery.

2. The method for processing poultry using a colony basket system as recited in claim 1, where the colony basket comprises:
   a. a perimetrical top rim flange defining an upward facing opening having a first geometry and a perimetrical bottom rim flange defining a downward facing opening where said downward facing opening is closed by a floor and said downward facing opening has a second geometry substantially identical to said first geometry of the top rim flange;
   b. vertically upright longitudinal side walls and at least one vertically upright latitudinal side wall perpendicularly extended between said bottom and top rim flanges such that said bottom and top rim flanges are in substantially parallel planes; and
   c. where said vertical slot extends from a gap in the top rim flange downward into the latitudinal side wall adapted for receiving and retaining the channel of the sustenance assembly.

3. The method of processing poultry using a colony basket system as recited in claim 1, further comprising the step of:
   a. stacking onto a colony basket stack said same colony basket with a plurality of other baskets forming a plurality of colony baskets, the plurality of colony baskets stacked vertically one on top of the other with bottoms of said colony baskets engaging tops of said colony baskets underneath.

4. The method of processing poultry using a colony basket system as recited in claim 3, further comprising:
   a. transferring the colony basket stack, where each colony basket of the colony basket stack has a separate grouping of birds, to a colony system; and
   b. transferring the colony basket stack from the colony system to a processing facility.

5. The method as recited in claim 3, further comprising the step of:
   transferring the colony basket stack to a flatbed of a transport and aligning said colony basket over a flatbed raised stand off for resisting lateral and longitudinal movement of the stack.

6. The method as recited in claim 3, further comprising the step of:
   transferring the colony basket stack from the flatbed of a transport to a poultry processing facility.

7. A method for processing poultry using a colony basket comprising the steps of:
  a. gathering at a hatchery together a grouping of birds into a first colony basket when the grouping of birds are day-old-chicks, where said first colony basket has at least one vertically upright latitudinal side wall having a vertical slot extending downward into the at least one vertically upright latitudinal side wall for receiving a channel, where the vertical slot is narrow and vertically elongated having substantially vertical and substantially parallel sides for retaining the channel and said at least one vertically upright latitudinal side wall having at least one standoff member protruding vertically upward;
  b. stacking at least a second colony basket on top of and immediately above the first colony basket and engaging the at least one standoff member with the bottom of the at least second colony basket to resist latitudinal movement of the first colony basket and the second colony basket one with respect to the other;
  c. transporting said same grouping of birds in said first and second colony baskets to a growing house having a colony system including a plurality of colony racks and inserting said first and second colony baskets containing said same grouping of birds in one of said plurality of colony racks;
  d. feeding and watering the same grouping of birds while the second colony basket is stacked above the first colony basket using the vertical slots through which to channel water;
  e. transferring said substantially same grouping of birds in said first and second colony baskets to a transport and transporting said first and second colony baskets containing said same grouping of birds to a processing facility;
  f. transferring said same grouping of birds in said first and second colony baskets out of the first and second colony baskets for processing;
  g. cleaning and emptying said first and second colony baskets; and
  h. transporting the emptied first and second colony baskets to the hatchery.

8. The method for processing poultry using a colony basket as recited in claim 7, comprising:
  extending a watering channel through the vertical slot where said watering channel has a vertically suspended water trough with said first and second colony basket having said same grouping of birds, and retaining said watering channel in said vertical slot.

9. The method for processing poultry using a colony basket as recited in claim 8, where the colony basket having a perimetrical top rim flange defining an upward facing opening having a first geometry and a perimetrical bottom rim flange defining a downward facing opening where said downward facing opening is closed by a floor and said downward facing opening has a second geometry substantially identical to said first geometry of the top rim flange, said colony basket further comprising,
  vertically upright longitudinal side walls where said vertically upright longitudinal side walls and said vertically upright latitudinal side walls perpendicularly extend between said bottom and top rim flanges such that said bottom and top rim flanges are in substantially parallel planes.

10. The method of processing poultry using a colony basket as recited in claim 9, further comprising:
  stacking a plurality of other colony baskets unto and immediately above the second colony basket forming a plurality of colony baskets, the plurality of colony baskets stacked vertically one on top of the other with bottoms of said plurality of other colony baskets engaging the tops of the colony baskets underneath.

11. The method of processing poultry using a colony basket as recited in claim 10, further comprising:
  transferring the colony basket stack to a flatbed of a transport for transporting to and from the hatchery and a colony system.

12. The method of processing poultry using a colony basket as recited in claim 11, further comprising:
  transferring the stacked plurality of colony baskets to the colony system, where each colony basket of the stacked plurality of colony baskets has a separate grouping of birds; and
  transferring the stacked plurality of colony baskets from the colony system to a poultry processing system.

* * * * *